(12) United States Patent
Shiraki et al.

(10) Patent No.: US 10,637,319 B2
(45) Date of Patent: *Apr. 28, 2020

(54) CORELESS ROTATING ELECTRICAL MACHINE WITH STATOR INCLUDING CYLINDRICAL COIL AND COOLING METHOD THEREFOR

(71) Applicant: CORELESS MOTOR CO., LTD., Yamato-shi, Kanagawa (JP)

(72) Inventors: Manabu Shiraki, Yamato (JP); Tsutomu Shiraki, Yamato (JP)

(73) Assignee: CORELESS MOTOR CO., LTD., Yamato-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,247

(22) Filed: Jul. 10, 2018

(65) Prior Publication Data

US 2018/0323673 A1 Nov. 8, 2018

Related U.S. Application Data

(63) Continuation of application No. 15/508,633, filed as application No. PCT/JP2015/056310 on Mar. 4, 2015.

(30) Foreign Application Priority Data

Sep. 4, 2014 (JP) .................................. 2014-180294

(51) Int. Cl.
*H02K 3/47* (2006.01)
*H02K 21/14* (2006.01)
(Continued)

(52) U.S. Cl.
CPC ............... *H02K 3/47* (2013.01); *H02K 1/274* (2013.01); *H02K 1/278* (2013.01); *H02K 5/161* (2013.01);
(Continued)

(58) Field of Classification Search
CPC .......... H02K 1/274; H02K 1/278; H02K 3/47; H02K 5/15; H02K 5/161; H02K 5/1735;
(Continued)

(56) References Cited

U.S. PATENT DOCUMENTS 4,562,367 A * 12/1985 Kumatani ............ H02K 7/1025
310/266
5,004,944 A 4/1991 Fisher
(Continued)

FOREIGN PATENT DOCUMENTS

JP  S62-189954 A  8/1987
JP  S62-268335 A  11/1987
(Continued)

OTHER PUBLICATIONS

May 26, 2015 International Search Report issued in International Patent Application No. PCT/JP2015/056310.
(Continued)

*Primary Examiner* — Alfonso Perez Borroto
*Assistant Examiner* — Rashad H Johnson
(74) *Attorney, Agent, or Firm* — Oliff PLC

(57) ABSTRACT

Present invention relates to a high performance rotating electrical machine which aims at downsizing, and challenges inevitable technical problems such as deterioration of efficiency η caused by copper loss and temperature rise inside the rotating electrical machine due to heat generation induced by eddy current generated in magnetic body. Such technical problem may be solved by: opposingly arranging a rotor 3 with a cup-type mount, the rotor 3 being integrated with magnets 4 equipped on an outer cylindrical air-channel forming body and an inner cylindrical air-channel forming body which forms an air gap where one of end faces of a cylindrical coil is arranged and being coupled to a driveshaft which penetrates a lid-type mount, with respect to a stator 2
(Continued)

with a lid-type mount rotatably coupled with the driveshaft, to which one of end faces of a cylindrically-shaped energizeable coreless cylindrical coil cylindrically formed using a laminate structure consisting of a few overlapping conductive metal sheets; feeding or intaking cooling medium or cooling air to an air gap formed in an inner surface of the cylindrical coil; and directly cooling an inner surface and outer surface of the cylindrical coil arranged in the air gap.

14 Claims, 22 Drawing Sheets

(51) Int. Cl.
    *H02K 1/27*     (2006.01)
    *H02K 5/173*     (2006.01)
    *H02K 9/02*     (2006.01)
    *H02K 9/04*     (2006.01)
    *H02K 5/16*     (2006.01)
    *H02K 9/06*     (2006.01)
    *H02K 5/15*     (2006.01)

(52) U.S. Cl.
    CPC ............. *H02K 5/1735* (2013.01); *H02K 9/02* (2013.01); *H02K 9/04* (2013.01); *H02K 9/06* (2013.01); *H02K 21/14* (2013.01); *H02K 5/15* (2013.01); *H02K 2213/03* (2013.01)

(58) Field of Classification Search
    CPC .. H02K 9/02; H02K 9/04; H02K 9/06; H02K 21/14; H02K 2213/03
    USPC .................................................. 310/61, 90.5
    See application file for complete search history.

(56) References Cited

U.S. PATENT DOCUMENTS

| | | | |
|---|---|---|---|
| 5,311,092 A | 5/1994 | Fisher | |
| 5,319,844 A | 6/1994 | Huang et al. | |
| 5,723,933 A | 3/1998 | Grundl et al. | |
| 6,873,085 B2 | 3/2005 | Graham et al. | |
| 2002/0171306 A1* | 11/2002 | Graham | H02K 1/27 310/156.12 |
| 2005/0231056 A1 | 10/2005 | Graham et al. | |
| 2006/0138879 A1* | 6/2006 | Kusase | B60K 7/0007 310/67 R |
| 2006/0208596 A1 | 9/2006 | Graham et al. | |
| 2006/0284509 A1* | 12/2006 | Han | H02K 16/02 310/156.81 |
| 2007/0200452 A1 | 8/2007 | Graham et al. | |
| 2012/0001521 A1* | 1/2012 | Shiraki | B60K 7/0007 310/67 R |
| 2013/0237138 A1* | 9/2013 | Matsuda | B60H 1/00457 454/141 |
| 2014/0368092 A1* | 12/2014 | Shiraki | B60K 7/0007 310/67 R |

FOREIGN PATENT DOCUMENTS

| | | |
|---|---|---|
| JP | H05-22133 U | 3/1993 |
| JP | H05-80159 U | 10/1993 |
| JP | H05-344680 A | 12/1993 |
| JP | H08-37769 A | 2/1996 |
| JP | H09-168246 A | 6/1997 |
| JP | 2657192 B2 | 9/1997 |
| JP | 2000-217321 A | 8/2000 |
| JP | 2004-538744 A | 12/2004 |
| JP | 3704044 B2 | 10/2005 |
| JP | 2006-246678 A | 9/2006 |
| JP | 2010-166717 A | 7/2010 |
| JP | 2012-016218 A | 1/2012 |
| JP | 2012-030786 A | 2/2012 |

OTHER PUBLICATIONS

Mar. 7, 2017 International Preliminary Report on Patentability issued in International Patent Application No. PCT/JP2015/056310.
Feb. 9, 2016 Office Action issued in Japanese Patent Application No. 2015-551643.
Sep. 3, 2019 Office Action Issued in U.S. Appl. No. 15/508,633.

* cited by examiner

FIG.21

24V-without air supply

| | Driving voltage : | 24V |
|---|---|---|
| | Air supply pressure : | 0 kPa |
| | Air supply flow : | 0 ℓ(op), 0 ℓ(stp)/min |
| | Date and time : | Jan. 7, 18:30~ 19:00 ~ 19:16 |

| Torque (N·m) | Rotation (RPM) | Current (A) | Input (W) | Output (W) | Coil Outside (°C) | Coil Inside (°C) | Ave. Temp. (°C) | Efficiency |
|---|---|---|---|---|---|---|---|---|
| 0.09 | 3,880 | 1.87 | 46 | 37 | 30 | 32 | 31 | 81% |
| 0.15 | 3,757 | 2.73 | 72 | 59 | 31 | 33 | 32 | 81% |
| 0.20 | 3,668 | 3.43 | 92 | 77 | 32 | 34 | 33 | 84% |
| 0.25 | 3,559 | 4.19 | 113 | 93 | 34 | 36 | 35 | 82% |
| 0.30 | 3,477 | 4.84 | 131 | 109 | 37 | 38 | 37 | 83% |
| 0.35 | 3,378 | 5.65 | 153 | 124 | 40 | 41 | 41 | 81% |
| 0.40 | 3,269 | 6.40 | 172 | 137 | 44 | 45 | 44 | 80% |
| 0.45 | 3,190 | 7.06 | 189 | 150 | 48 | 49 | 48 | 79% |
| 0.50 | 3,074 | 7.91 | 210 | 161 | 54 | 55 | 54 | 77% |
| 0.55 | 2,967 | 8.62 | 229 | 171 | 61 | 62 | 61 | 75% |
| 0.60 | 2,849 | 9.44 | 248 | 179 | 69 | 70 | 69 | 72% |
| 0.65 | 2,720 | 10.21 | 267 | 185 | 78 | 79 | 78 | 69% |
| 0.70 | 2,561 | 11.03 | 286 | 189 | 89 | 91 | 90 | 66% |
| 0.75 | 2,406 | 11.92 | 307 | 189 | 104 | 105 | 105 | 62% |

24V-with 30L (stp)/min

| | Driving voltage : | 24 V |
|---|---|---|
| | Air supply pressure : | 50 kPa |
| | Air supply flow : | 20 ℓ(op), 30 ℓ(stp)/min |
| | Date and time : | Jan. 9, 09:47~ 09:58 ~ 10:18 |

| Torque (N·m) | Rotation (RPM) | Current (A) | Input (W) | Output (W) | Coil Outside (°C) | Coil Inside (°C) | Ave. Temp. (°C) | Efficiency |
|---|---|---|---|---|---|---|---|---|
| 0.08 | 3,917 | 1.69 | 40 | 32 | 25 | 24 | 24 | 80% |
| 0.15 | 3,782 | 2.64 | 72 | 59 | 26 | 25 | 25 | 82% |
| 0.20 | 3,699 | 3.32 | 92 | 77 | 27 | 26 | 26 | 84% |
| 0.25 | 3,622 | 3.96 | 111 | 95 | 28 | 26 | 27 | 86% |
| 0.30 | 3,524 | 4.74 | 133 | 111 | 29 | 27 | 28 | 84% |
| 0.35 | 3,438 | 5.40 | 151 | 126 | 32 | 29 | 30 | 83% |
| 0.40 | 3,345 | 6.11 | 170 | 140 | 34 | 32 | 33 | 82% |
| 0.45 | 3,251 | 6.80 | 189 | 153 | 37 | 34 | 35 | 81% |
| 0.50 | 3,147 | 7.55 | 206 | 165 | 42 | 38 | 40 | 79% |
| 0.55 | 3,044 | 8.30 | 227 | 175 | 46 | 42 | 44 | 77% |
| 0.60 | 2,941 | 9.00 | 244 | 185 | 51 | 46 | 48 | 76% |
| 0.65 | 2,825 | 9.79 | 263 | 192 | 57 | 52 | 55 | 73% |
| 0.70 | 2,701 | 10.52 | 280 | 198 | 64 | 56 | 60 | 71% |
| 0.75 | 2,574 | 11.29 | 299 | 202 | 72 | 63 | 68 | 68% |
| 0.80 | 2,423 | 12.14 | 317 | 203 | 80 | 69 | 75 | 64% |
| 0.85 | 2,276 | 12.92 | 335 | 203 | 89 | 77 | 83 | 61% |
| 0.90 | 2,123 | 13.72 | 354 | 200 | 101 | 88 | 94 | 56% |
| 0.93 | 1,991 | 14.29 | 366 | 194 | 111 | 96 | 103 | 53% |

24V-with 144L (stp)/min

| | Driving voltage : | 24 V |
|---|---|---|
| | Air supply pressure : | 265 kPa |
| | Air supply flow : | 40 ℓ(op), 144 ℓ(stp)/min |
| | Date and time : | Jan. 9, 13:49~ 13:59 ~ 14:19 |

| Torque (N·m) | Rotation (RPM) | Current (A) | Input (W) | Output (W) | Coil Outside (°C) | Coil Inside (°C) | Ave. Temp. (°C) | Efficiency |
|---|---|---|---|---|---|---|---|---|
| 0.09 | 3,890 | 1.83 | 45 | 37 | 24 | 23 | 23 | 82% |
| 0.15 | 3,780 | 2.65 | 72 | 59 | 24 | 24 | 24 | 82% |
| 0.20 | 3,693 | 3.34 | 92 | 77 | 25 | 24 | 24 | 84% |
| 0.25 | 3,612 | 4.01 | 111 | 95 | 26 | 24 | 25 | 85% |
| 0.30 | 3,517 | 4.72 | 131 | 111 | 27 | 25 | 26 | 85% |
| 0.35 | 3,421 | 5.44 | 151 | 125 | 28 | 27 | 28 | 83% |
| 0.40 | 3,328 | 6.17 | 170 | 139 | 30 | 28 | 29 | 82% |
| 0.45 | 3,279 | 6.91 | 190 | 152 | 32 | 31 | 31 | 80% |
| 0.50 | 3,141 | 7.56 | 207 | 164 | 35 | 32 | 34 | 79% |
| 0.55 | 3,038 | 8.27 | 225 | 175 | 38 | 34 | 36 | 78% |
| 0.60 | 2,932 | 9.04 | 244 | 184 | 41 | 37 | 39 | 75% |
| 0.65 | 2,816 | 9.75 | 260 | 192 | 45 | 40 | 42 | 74% |
| 0.70 | 2,697 | 10.55 | 279 | 198 | 49 | 42 | 45 | 71% |
| 0.75 | 2,603 | 11.21 | 295 | 202 | 53 | 45 | 49 | 68% |
| 0.80 | 2,487 | 11.90 | 311 | 206 | 58 | 49 | 53 | 66% |
| 0.85 | 2,346 | 12.72 | 329 | 209 | 64 | 53 | 58 | 64% |
| 0.90 | 2,229 | 13.48 | 347 | 208 | 71 | 59 | 65 | 60% |
| 0.94 | 2,096 | 14.25 | 364 | 207 | 79 | 65 | 72 | 57% |

FIG.22

48V-without air supply

| Driving voltage : | 48 V |
| Air supply pressure : | 0 kPa |
| Air supply flow : | 0 ℓ(op), 0 ℓ(stp)/min |
| Date and time : | Jan. 8, 15:02- 16:32 - 16:46 |

| Torque (N·m) | Rotational (RPM) | Current (A) | Input (W) | Output (W) | Coil Outside (°C) | Coil Inside (°C) | Ave. Temp. (°C) | Efficiency |
|---|---|---|---|---|---|---|---|---|
| 0.10 | 8,109 | 2.52 | 112 | 85 | 52 | 54 | 53 | 76% |
| 0.15 | 7,929 | 3.28 | 164 | 133 | 53 | 55 | 54 | 81% |
| 0.20 | 7,868 | 3.83 | 199 | 165 | 54 | 57 | 55 | 83% |
| 0.25 | 7,743 | 4.54 | 242 | 203 | 56 | 59 | 57 | 84% |
| 0.30 | 7,662 | 5.34 | 287 | 249 | 58 | 61 | 60 | 87% |
| 0.35 | 7,538 | 6.02 | 327 | 276 | 61 | 64 | 62 | 84% |
| 0.40 | 7,437 | 6.69 | 365 | 312 | 64 | 67 | 65 | 86% |
| 0.45 | 7,374 | 7.44 | 406 | 348 | 68 | 71 | 69 | 86% |
| 0.50 | 7,225 | 8.26 | 451 | 378 | 73 | 77 | 75 | 84% |
| 0.55 | 7,123 | 8.95 | 489 | 410 | 80 | 83 | 81 | 84% |
| 0.60 | 7,017 | 9.89 | 534 | 441 | 87 | 90 | 89 | 83% |
| 0.65 | 6,883 | 10.74 | 583 | 470 | 97 | 100 | 98 | 81% |

48V-with 30 L (stp)/min

| Driving voltage : | 48 V |
| Air supply pressure : | 50 kPa |
| Air supply flow : | 20 ℓ(op), 30 ℓ(stp)/min |
| Date and time : | Jan. 8, 19:05- 19:35 - 19:53 |

| Torque (N·m) | Rotational (RPM) | Current (A) | Input (W) | Output (W) | Coil Outside (°C) | Coil Inside (°C) | Ave. Temp. (°C) | Efficiency |
|---|---|---|---|---|---|---|---|---|
| 0.09 | 7,993 | 2.99 | 109 | 75 | 41 | 40 | 40 | 69% |
| 0.15 | 7,890 | 3.13 | 155 | 124 | 42 | 40 | 41 | 80% |
| 0.20 | 7,760 | 3.79 | 195 | 163 | 43 | 42 | 42 | 84% |
| 0.25 | 7,663 | 4.61 | 244 | 209 | 44 | 43 | 44 | 86% |
| 0.30 | 7,589 | 5.20 | 282 | 238 | 46 | 44 | 45 | 85% |
| 0.35 | 7,528 | 5.94 | 324 | 276 | 49 | 46 | 47 | 85% |
| 0.40 | 7,397 | 6.69 | 366 | 310 | 51 | 49 | 50 | 85% |
| 0.45 | 7,280 | 7.39 | 404 | 343 | 54 | 51 | 52 | 85% |
| 0.50 | 7,198 | 8.08 | 441 | 377 | 57 | 54 | 55 | 85% |
| 0.55 | 7,079 | 8.86 | 484 | 408 | 61 | 57 | 59 | 84% |
| 0.60 | 6,959 | 9.65 | 526 | 437 | 65 | 61 | 63 | 83% |
| 0.65 | 6,855 | 10.30 | 562 | 467 | 70 | 65 | 67 | 83% |
| 0.70 | 6,788 | 11.18 | 607 | 492 | 76 | 70 | 73 | 81% |
| 0.75 | 6,604 | 11.87 | 644 | 519 | 84 | 77 | 80 | 81% |
| 0.80 | 6,488 | 12.62 | 682 | 537 | 92 | 84 | 88 | 79% |
| 0.85 | 6,351 | 13.99 | 723 | 559 | 102 | 93 | 97 | 77% |

48V-with 144 L (stp)/min

| Driving voltage : | 48 V |
| Air supply pressure : | 265 kPa |
| Air supply flow : | 40 ℓ(op), 144 ℓ(stp)/min |
| Date and time : | Jan. 8, 20:45- 21:15 - 21:38 |

| Torque (N·m) | Rotational (RPM) | Current (A) | Input (W) | Output (W) | Coil Outside (°C) | Coil Inside (°C) | Ave. Temp. (°C) | Efficiency |
|---|---|---|---|---|---|---|---|---|
| 0.09 | 7,929 | 2.47 | 107 | 75 | 33 | 30 | 32 | 70% |
| 0.15 | 7,828 | 3.15 | 156 | 123 | 34 | 31 | 32 | 79% |
| 0.20 | 7,729 | 3.81 | 196 | 162 | 35 | 31 | 33 | 83% |
| 0.25 | 7,660 | 4.44 | 238 | 201 | 35 | 33 | 34 | 85% |
| 0.30 | 7,554 | 5.18 | 281 | 237 | 37 | 33 | 35 | 84% |
| 0.35 | 7,438 | 5.86 | 320 | 272 | 38 | 34 | 36 | 85% |
| 0.40 | 7,362 | 6.60 | 360 | 308 | 39 | 36 | 37 | 86% |
| 0.45 | 7,268 | 7.27 | 401 | 342 | 42 | 37 | 39 | 85% |
| 0.50 | 7,175 | 8.03 | 442 | 376 | 45 | 39 | 42 | 85% |
| 0.55 | 7,069 | 8.68 | 477 | 408 | 47 | 41 | 44 | 86% |
| 0.60 | 6,989 | 9.51 | 522 | 438 | 51 | 44 | 47 | 84% |
| 0.65 | 6,868 | 10.11 | 554 | 460 | 54 | 47 | 50 | 83% |
| 0.70 | 6,791 | 10.95 | 597 | 499 | 58 | 50 | 54 | 84% |
| 0.75 | 6,620 | 11.63 | 632 | 520 | 62 | 53 | 57 | 82% |
| 0.80 | 6,528 | 12.99 | 674 | 546 | 67 | 56 | 61 | 81% |
| 0.85 | 6,393 | 13.11 | 711 | 569 | 72 | 60 | 66 | 80% |
| 0.90 | 6,276 | 13.85 | 748 | 592 | 78 | 65 | 71 | 79% |
| 0.95 | 6,138 | 14.65 | 787 | 604 | 86 | 71 | 79 | 77% |
| 1.00 | 5,982 | 15.38 | 824 | 621 | 95 | 78 | 86 | 75% |
| 1.05 | 5,828 | 16.25 | 868 | 641 | 104 | 86 | 95 | 74% | ved application of U.S.

CORELESS ROTATING ELECTRICAL MACHINE WITH STATOR INCLUDING CYLINDRICAL COIL AND COOLING METHOD THEREFOR

CROSS REFERENCE TO RELATED APPLICATION

This application is a continuation application of U.S. application Ser. No. 15/508,633 filed Mar. 3, 2017, pending, the disclosure of which is hereby incorporated by reference herein in its entirety.

TECHNICAL FIELD

The present invention relates to a coreless rotating electrical machine comprising a stator including a cylindrical coil and its cooling method. More specifically, the present invention relates to coreless rotating electrical machine constructed with a stator including a cylindrical coil which is cylindrically formed as a laminate structure of conductive metal sheets and a rotor sandwiching the cylindrical coil and forming air gap, and cooling method for cooling the air gap including the cylindrical coil of the coreless rotating electrical machine

BACKGROUND ART

An electric motor is a device which converts electrical energy to kinetic energy. An electric motor may be classified as DC motor or AC motor, inner-rotor type or outer-rotor type based on positional relationship of a stator and a rotor, and winding-field type or permanent-magnet type. Either classification includes an electric motor which utilizes so-called revolving-field, in which a stator revolves field direction to influence a rotor to rotate.

In a revolving-field motor constructed with a stator including a cylindrical coil and a rotor sandwiching the cylindrical coil and forming air gap, it is well-known that heat is generated by resistance (copper loss) of the cylindrical coil, eddy current at an inner yoke and an outer yoke of a conductor forming the cylindrical coil and the air gap, and hysteresis of an iron core. It is also well-known that copper loss or hysteresis which converts magnetic energy to thermal energy is an inevitable technical problem.

To address influence to output and/or efficiency of an electric motor induced by the above technical problem and heat-induced deterioration of coercive force of permanent magnets equipped on an outer surface of an inner yoke and/or on an inner surface of an outer yoke which configure a rotor, it has been attempted to cool coiled surface of windings, but it does not yet lead to fundamental solution. The inventors of the present invention have challenged the technical problem and developed a coreless rotating electrical machine comprising a stator including a cylindrical coil and its cooling method.

Patent Document 1 (Japanese Laid-Open Patent Publication 2012-016218A) describes a wheel-in motor with a coreless type coil. More specifically, this electric motor is a motor in which a cylindrical-shaped outer yoke integrated with a wheel and a cylindrical-shaped inner yoke forming air gap between the outer yoke configure a rotor rotatably mounted to a fixed shaft, a cylindrical-shaped coil arranged in the air gap configures a stator coupled with the fixed shaft, and permanent magnets equipped in an inner surface of the outer yoke configuring the rotor are configured to be opposingly arranged on an outer surface of a coil configuring a stator.

Patent Document 2 (Japanese Laid-Open Patent Publication 2012-030786A) describes a wheel-in motor with a coreless type coil having a similar configuration of the rotor and the stator described in Patent Document 1. The electric motor described in Patent Document 2 further includes a braking means fixed to an inner yoke in a space formed in an inner surface of the inner yoke of a rotor.

Patent Document 1 does not describe for a cooling means against heat generated when operating an electric motor, whereas Patent Document 2 describes as that the electric motor thereof includes a cooling means for a space in the motor which is formed with an inner surface of the inner yoke and an inner surface of the wheel by opening an end face of the wheel fixed to the outer yoke to the stator and using the end face as a vent hole to allow for communicating an interior of the motor with ambient air. The vent hole allows for communicating the space formed on the inner surface of the cylindrical inner yoke with ambient air and is considered as a cooling means for mitigating frictional heat caused by braking, but it is not intended to directly cool air gap formed with a coil, an inner yoke and an outer yoke, which is a later-described feature of the present invention.

Patent Document 3 (Japanese Patent No. 2,657,192B) discloses a linear DC brushless motor which is a linear motor configured with a slider arranged with field magnets which relatively slide with respect to a fixed armature, and is not a revolving field motor which is an object of the present invention.

The linear motor has an air supply channel drilled in the fixed armature and is "configured to directly blow air from the air supply channel to the armature coil to cool the armature coil as well as to cool a stator yoke itself with respect to a magnet yoke". The fixed armature is configured with a stator yoke in which a plurality of rectangular air-core coil, formed by winding a lead wire for multiple turns, is bonded on a printed wiring board in moving direction of a slider, but the coil formed by winding a lead wire for multiple turns may not be thoroughly cooled even by directly blowing air to the armature.

Patent Document 4 (Japanese Laid-Open Patent Publication 2006-246678A) describes an outer-rotor type wheel-in motor. There is described a cooling means for a coil formed by winding a lead wire for multiple turns which is mounted on 6 salient poles on a stator side in a SR motor configured with 6 salient poles on a stator side and 4 salient poles on a rotor side provided on a hollow shaft.

In the cooling means, an inflow channel and an exhaust channel are provided via a bulkhead, air is supplied to a coil through the inflow channel, and air after contacting the coil is discharged to outside of a stator through the exhaust channel Patent Document 4 thereby presents a wheel-in motor in which a channel is formed for exhausting air after cooling a heated coil. However, this cooling means, similarly as that of Patent Document 3, may not allow for thoroughly cooling the lead wire which is wound for multiple turns even by blowing air directly to the coil, because the air flows only on an exposed surface of the lead wire which is wound for multiple turns.

Patent Document 5 (Japanese Patent No. 3,494,056B) describes an outer rotor type magnetic generator comprising a stator with a coil wound around an annular stator core and a rotor consisting of an outer yoke with permanent magnets being supported on an inner surface of a cylindrical part which covers an outer periphery of the stator, wherein the rotor is fixed to a rotating shaft which the stator is rotatably coupled thereto.

In the electric motor, a vent hole is provided on a plate which supports a stator rotatably coupled to the rotating shaft, the vent hole on the plate is communicated with a vent hole provided on a bottom of a rotor for cooling a coil wound around a stator core and an inner surface of the permanent magnets, the rotor is rotated so that air is intaken from the vent hole on the plate and is discharged from the vent hole of the rotor, the discharged air is further blown to the cylindrical part of the rotor for cooling the permanent magnets through the cylindrical part.

Patent Document 6 (Japanese Laid-Open Utility Model Publication H5-022133A) describes a cooling means for forced cooling of interior of an outer rotor type wheel-in motor for an electric vehicle. The electric motor includes a cooling means which intakes ambient air to interior of a stator from a vent hole on a hollow shaft through a filter by a cooling fan which is in communication with the hollow shaft, and exhausts the air after contacting a coil of the stator and the inner surface of the rotor from an exhaust hole on a partitioning plate.

Patent Document 7 (U.S. Pat. No. 6,873,085) describes a cylindrical coil formed in a cylindrical shape to be mounted in a coreless type coil motor including a fixed armature and in a rotating armature. However, the electric motor does not have a cooling means for the cylindrical coil and air gap formed with a cylindrical coil, an outer yoke and an inner yoke.

Patent Document 8 (Japanese Patent No. 3,704,044B) describes a coreless armature for a DC motor, which includes a cylindrical coil processed with patterns which generate a series of substantially parallel conductors being mutually separated by polyamide which is an insulating material.

PRIOR ART DOCUMENTS

Patent Documents

The prior art documents referred to in the above and the following descriptions are listed below
Patent Document 1: Japanese Laid-Open Patent Publication 2012-016218A
Patent Document 2: Japanese Laid-Open Patent Publication 2012-030786A
Patent Document 3: Japanese Patent No. 2,657,192B
Patent Document 4: Japanese Laid-Open Patent Publication 2006-246678A
Patent Document 5: Japanese Patent No. 3,494,056B
Patent Document 6: Japanese Laid-Open Utility Model Publication H5-022133A
Patent Document 7: U.S. Pat. No. 6,873,085B2
Patent Document 8: Japanese Patent No. 3,704,044B Non-Patent Documents Non-Patent Document 1: "Best Colored Illustration, All of Current Motor Technology", Edited by Kan Akatsu, Natsume Publishing Planning Co., Ltd. (Published on Jul. 20, 2013)

DISCLOSURE OF THE INVENTION

Problem to be Solved by the Invention

Temperature rise inside a motor induced by copper loss of a cylindrical coil and eddy current generated in a conductor in a coreless rotating electrical machine configured with a stator including a cylindrical coil and a rotor forming an air gap where the cylindrical coil is arranged deteriorates efficiency $\eta$ of an electric motor and is recognized as an inevitable technical problem inherent in an electric motor. Various proposals have been made to address the problem but have not led to fundamental solution. The inventors of the present invention have challenged the technical problem and developed a coreless rotating electrical machine comprising a stator including a cylindrical coil of the present invention.

Means for Solving the Problem

The technical problem of the present invention has been solved by: opposingly arranging a rotor 3 with a cup-shape mount coupled to a driveshaft which penetrates a lid-type mount, the rotor 3 being integrated with magnets 4 equipped on an outer cylindrical air-channel forming body and an inner cylindrical air-channel forming body which forms an air gap where one of end faces of a cylindrical coil is arranged, with respect to a stator 2 with a lid-type mount rotatably coupled with a driveshaft, to which one of end faces of a cylindrically-shaped energizeable coreless cylindrical coil cylindrically formed using a laminate structure consisting of a few overlapping conductive metal sheets; feeding or intaking cooling medium or cooling air to an air gap formed in an inner surface of the cylindrical coil; and directly cooling an inner surface and outer surface of the cylindrical coil as well as the magnets 4 equipped in the air gap.

A first aspect of the present invention, as shown in FIG. 1 and FIG. 2, relates to a coreless rotating electrical machine 10 comprising:
a stator 2 in which a driveshaft 100 is rotatably coupled to a center part 310 of a lid-type mount 300 which fixes one of end faces 201 of an energizeable coreless cylindrical coil 200 cylindrically formed using a laminate structure consisting of a few overlapping conductive metal sheets in such a manner that each sheet is covered by insulting layer, with a plurality of line parts being spaced in longitudinal direction; a rotor 3 which is constructed such that another end face 202 of the cylindrical coil 200 is closed leaving a clearance with respect to a cup-type mount 400 opposingly positioned with respect to the lid-type mount 300 and that the cylindrical coil 200 is arranged in a first air space 40 which forms an air gap between an inner cylindrical air-channel forming body 500 and an outer cylindrical air-channel forming body 600 which are integrated with the cup-type mount 400, and further that the driveshaft 100 penetrating through a center part 310 of the lid-type mount 300 is coupled to a center part 410 of the cup-type mount 400, and magnets 4 are equipped on an inner surface of the outer cylindrical air-channel forming body 600 and/or the inner cylindrical air-channel forming body 500 in the first air space 40;
a second air space 20 positioned on inner surface side 210 of the cylindrical coil 200 and a third space 30 positioned on outer surface 220 of the cylindrical coil 200 formed between ones of end faces 530, 630 of the inner cylindrical air-channel forming body 500 and the outer cylindrical air-channel forming body 600 and the lid-type mount 300.

The coreless rotating electrical machine 10, as shown in FIG. 1, is further characterized in that a means for feeding or intaking cooling medium or cooling air 80 is provided in the second air space 20, in such a manner that the cooling medium or cooling air 80 is passed inside and outside of the cylindrical coil 200 arranged in the first air space 40 and is discharged from the third air space 30.

In one embodiment of the present invention, as shown in FIG. 2,
the lid-type mount 300 is constructed with a bearing mechanism 311 which rotatably supports the driveshaft 100 at the center part 310, a base 312 which cylindrically fixes one of the end face 201 of the cylindrical coil 200 including the center part 310, and a cylinder 313 extending from the base 312 including the center part 310, wherein the bearing mechanism 311 may include a bearing 3110 which cooperates with each of the base 312 and the cylinder 313.

It may be constructed such that the base 312 comprises a pedestal 314; a fixing plate 315 for cylindrically fixing one of the end faces 201 of the cylindrical coil 200 supported by the pedestal 314 may further be provided; and the cylinder 313 penetrates and extends through a center of the fixing plate 315.

The cylindrical coil 200 comprises lead wires 3001 connected to one of the end faces 201, and the lid-type mount 300 may further comprise a channel 3200 leading to the second air space 20 for feeding or intaking the cooling medium or cooling air 80.

In one embodiment of the present invention, as shown in FIG. 1, FIG. 2 and FIG. 3,
the cup-type mount 400 may be constructed with: a support 411 including the center part 410 to which the driveshaft 100 is coupled; an outer cylindrical air-channel forming body 600 configuring an outer cylinder of the cup-type mount 400 and an inner cylindrical air-channel forming body 500 configuring an inner cylinder of the cup-type mount 400 which an inner surface 510 thereof is configured to form a space 540 leading to the second air space 20, both of which are integrally formed with the support 411 or separately formed and integrally fixed to the support 411; and magnets 4 equipped on an inner surface 610 of the outer cylindrical air-channel forming body 600 and/or on an outer surface 520 of the inner cylindrical air-channel forming body 500 which form the first air space 40.

By the way, magnets 4 may be cuboid being shaped such that a long side corresponds to a length of the cylindrical coil 200 arranged in the first air space 40 and a short side is equipped along longitudinal direction with intervals 401 in circumferential direction of the cylindrical coil 200. It is preferable to equip each of magnets 4 with an interval 401 along longitudinal direction of the cylindrical coil 200.

In one embodiment of the present invention, as shown in FIG. 1,
the support 411 of the cup-type mount 400 further comprises a cylindrical part 412 opposingly arranged to a cylinder 313 of the lid-type mount 300 through which the driveshaft 100 penetrates, and may further be provided with vent holes 430 for intaking ambient air to a space 540 formed on inner surface side 510 of the inner cylindrical air-channel forming body 500 and a filter 431 which covers the vent holes 430.

The above configuration allows for intaking ambient air to the space 540 under differential pressure generated around a rotor 3 by rotation thereof. As the filter 431 rotates at high speed with the rotor, any dust may be thrown off, and thereby plugging of the filter 431 may be avoided.

In one embodiment of the present invention, as shown in FIG. 2, FIG. 3 and FIG. 4,
the cup-type mount 400 may further be provided with inner exhaust holes 560 at positions in the inner cylindrical air-channel forming body 500 and/or outer exhaust holes 660 at positions in the outer cylindrical air-channel forming body 600 which correspond to each interval of the magnets 4 equipped with intervals 401 along longitudinal direction of the cylindrical coil 200

In one embodiment of the present invention, as shown in FIG. 5,
the stator 2 may further comprise an armor 9 having a protection cover 900 with a larger inner diameter than an outer diameter of the outer cylindrical air-channel forming body 600 which one of end faces 901 thereof is supported by the lid-type mount 300, and the armor 9 may further be provided with vent holes 910, in a part of the armor 9, outlets 90 for discharging the cooling medium or cooling air 80 discharged from the first air space 40, and an outlet 902 for lead wires 3001.

In one embodiment of the present invention, as shown in FIG. 6,
a hollow body 1100 is formed in the driveshaft 100 in a region penetrating through the lid-type mount 300 and the cup-type mount 400; the hollow body 1100 of the driveshaft 100 in the region penetrating through the lid-type mount 300 comprises an inlet 1110 for receiving the cooling medium or cooling air 80; and the hollow body 1100 of the driveshaft 100 in the region penetrating through the cup-type mount 400 comprises an outlet 1120 for discharging the cooling medium or cooling air 80; wherein the inlet 1110 may be made in communication with a channel 3200 of the lid-type mount 300 and the outlet 1120 may be made in communication with the space 540 connected to the second air space 20, thereby not only the second air space 20 but also the entire interior of the coreless rotating electrical machine is to be cooled.

In one embodiment of the present invention, as shown in FIG. 7,
cooling effect may be improved by providing a multi-vane centrifugal blowing rotating body 2000 fit into an outer cylindrical air-channel forming body 600 and configured like a water-turbine with two circular plates 2100 having a width corresponding to the third air space 30 and an outer exhaust hole 660 and with a plurality of vanes 2200 oriented to a shaft center of the circular plates 2100 and suspended on the two circular plates 2100, such that flow of the cooling medium or cooling air 80 in the first air space 40 is raised.

In one embodiment of the present invention,
the cylindrical coil 200 may be formed as a laminate structure with a thickness of 5 mm or less, and the inner cylindrical air-channel forming body 500 and the outer cylindrical air-channel forming body 600 formed from any of magnetic yoke, ceramic or heat-resist resin may be used.

A second aspect of the present invention, as shown in FIG. 1, FIG. 2 and FIG. 3, relates to a cooling method for a coreless rotating electrical machine 10.

That is, the present invention is a cooling method for a coreless rotating electrical machine 10 comprising:
a stator 2 in which a driveshaft 100 is rotatably coupled to a center part 310 of a lid-type mount 300 which fixes one of end faces 201 of an energizeable coreless cylindrical coil 200 cylindrically formed using a laminate structure consisting of a few overlapping conductive metal sheets in such a manner that each sheet is covered by insulting layer, with a plurality of line parts being spaced in longitudinal direction;
a rotor 3 which is constructed such that another end face 202 of the cylindrical coil 200 is closed leaving a clearance with respect to a cup-type mount 400 opposingly positioned with respect to the lid-type mount 300 and that the cylindrical coil 200 is arranged in a first air space 40 which forms an air gap between an inner cylindrical air-channel forming body 500 and an outer cylindrical air-channel forming body 600 which are integrated with the cup-type mount 400, and further that the driveshaft 100 penetrating through a center part 310 of the lid-type mount 300 is coupled to a center part 410 of the cup-type mount 400, and magnets 4 are equipped on an inner surface of the outer cylindrical air-channel forming body 600 and/or the inner cylindrical air-channel forming body 500 in the first air space 40;

a second air space 20 positioned on inner surface side 210 of the cylindrical coil 200 and a third space 30 positioned on outer surface 220 of the cylindrical coil 200 formed between ones of end faces 530, 630 of the inner cylindrical air-channel forming body 500 and the outer cylindrical air-channel forming body 600 and the lid-type mount 300.

The method comprises steps of:
operating a rotor 3 by energizing the cylindrical coil 200;
feeding or intaking the cooling medium or cooling air 80 into the second air space 20;
directly cooling both surfaces of the cylindrical coil 200 with the cooling medium or cooling air 80; and
discharging the cooling medium or cooling air 80 after flowing through the first air space 40 from the coreless rotating electrical machine 10.

In one embodiment of the present invention, as shown in FIG. 1,
the lid-type mount 300 further comprises a channel 3200 leading to the second air space 20 positioned on inner surface side 210 of the cylindrical coil 200, wherein, the method may further comprise a step of feeding or intaking the cooling medium or cooling air 80 into the second air space 20 from the channel 3200.

In one embodiment of the present invention,
the cup-type mount 400 may be provided with vent holes 430 for intaking ambient air into a space 540 formed on inner surface side 510 of the inner cylindrical air-channel forming body 500 and a filter 431 for covering the vent holes 430, wherein, the method may further comprise a step of intaking ambient air and simultaneously making the first air space 40 suck the cooling medium or cooling air 80 thereinto under differential pressure generated around the rotor 3 by rotation thereof such that internal cooling effect for the coreless rotating electrical machine 10 may be improved.

In one embodiment of the present invention, as shown in FIG. 5,
the stator 2 further comprises an armor 9 having a protection cover 900 with a larger inner diameter than an outer diameter of the outer cylindrical air-channel forming body 600 which one of end faces 901 thereof is supported by the lid-type mount 300, and the armor 9 may be provided with vent holes 910 and outlets 90 in a part of the armor 9, wherein, the method may further comprise a step of discharging the cooling medium or cooling air 80 discharged from the first air space 40 through the outlets 90.

In one embodiment of the present invention, as shown in FIG. 6,
a hollow body 1100 is formed in the driveshaft 100 in a region penetrating through the lid-type mount 300 and the cup-type mount 400; the hollow body 1100 of the driveshaft 100 in the region penetrating through the lid-type mount 300 comprises an inlet 1110 in communication with a channel 3200 in the lid-type mount 300 for receiving the cooling medium or cooling air 80; the hollow body 1100 of the driveshaft 100 in the region penetrating through the cup-type mount 400 comprises an outlet 1120 in communication with a space 540 leading to the second air space 20 for discharging the cooling medium or cooling air 80, wherein, the method may further comprise a step of discharging the cooling medium or cooling air 80 via the inlet 1110 to the space 540 leading to the second air space 20 from the outlet 1120 in order to cool the entire interior of the coreless rotating electrical machine 10.

In one embodiment of the present invention, as shown in FIG. 4, FIG. 5 and FIG. 7,
the magnets 4 may be cuboid being shaped such that a long side corresponds to a length of the cylindrical coil 200 arranged in the first air space 40 and a short side is equipped along longitudinal direction with intervals 401 in circumferential direction of the cylindrical coil 200; the cup-type mount 400 may further be provided with inner exhaust holes 560 at positions in the inner cylindrical air-channel forming body 500 and/or outer exhaust holes 660 at positions in the outer cylindrical air-channel forming body 600 which correspond to each interval of the magnets 4 equipped with intervals 401 along longitudinal direction of the cylindrical coil 200, wherein, the method may further comprise a step of discharging the cooling medium or cooling air 80 fed into the first air space 40 from the third air space 30 and the outer exhaust holes 660 under differential pressure generated around the rotor 3 by rotation thereof.

The cup-type mount 400, as shown in FIG. 7, may further be provided with a multi-vane centrifugal blowing rotating body 2000 fit into the outer cylindrical air-channel forming body 600 and configured like a water-turbine with two circular plates 2100 having a width corresponding to the third air space 30 and an outer exhaust holes 660 and with a plurality of vanes 2200 oriented to a shaft center of the circular plates 2100 and suspended on the two circular plates 2100, wherein, the method may further comprise a step of amplifying furthermore differential pressure generated around a rotor 3 by rotation thereof for discharging the cooling medium or cooling air 80 from the third air space 30 and the outer exhaust holes 660, such that velocity of flow of the cooling medium or cooling air 80 in the first air space 40 may be raised.

A third aspect of the present invention, as shown in FIG. 8, relates to a coreless rotating electrical machine 10 comprising:
a stator 2 in which a driveshaft 100 is rotatably coupled to a center part 310 of a lid-type mount 300 which fixes one of end faces 201 of an energizeable coreless cylindrical coil 200 cylindrically formed using a laminate structure consisting of a few overlapping conductive metal sheets in such a manner that each sheet is covered by insulting layer, with a plurality of line parts being spaced in longitudinal direction;
a rotor 3 consisting of an intermediate mount 1000 coupled to an intermediate part 110 of the driveshaft 100 which penetrates the center part 310 of the lid-type mount 300, an inner cylindrical air-channel forming body 500 integrally mounted to an outer surface 1200 of the intermediate mount 1000, and magnets 4 equipped on an outer surface 520 of the inner cylindrical air-channel forming body 500;
a second rotor 5 consisting of a cup-type mount 400 comprising an outer cylindrical air-channel forming body 600 which is constructed that it is opposingly positioned with respect to the lid-type mount 300 to form a first air space 40 which forms an air gap between an inner cylindrical air-channel forming body 500 and configured to close another end face 202 of the cylindrical coil 200 arranged in the first air space 40 leaving a clearance, wherein, the driveshaft 100 rotatably coupled to the center part 310 of the lid-type mount 300 is rotatably coupled to an end part 120 which penetrates a center part 1100 of the intermediate mount 1000;
a second air space 20 positioned on inner surface side 210 of the cylindrical coil 200, formed between ones of end faces 530, 630 of the inner cylindrical air-channel forming body 500 and the outer cylindrical air-channel forming body 600 and the lid-type mount 300; and a third air space 30 positioned on outer surface side 220 of the cylindrical coil 200.

The coreless rotating electrical machine 10, as shown in FIG. 8, is characterized in that,
a means for feeding or intaking cooling medium or cooling air 80 in the second air space 20 is further provided, in such a manner that the cooling medium or cooling air 80 is passed inside and outside of the cylindrical coil 200 arranged in the first air space 40 and is discharged from the third air space 30.

In one embodiment of the present invention, as shown in FIG. 8 and FIG. 9, the lid-type mount 300 is constructed with a bearing mechanism 311 which rotatably supports the driveshaft 100 at the center part 310; a base 312 which cylindrically fixes one of the end faces 201 of the cylindrical coil 200 including the center part 310; and a cylinder 313 extending from the base 312 including the center part 310, wherein, the bearing mechanism 311 may include a bearing 3110 which cooperates with each of the base 312 and the cylinder 313. It may be constructed such that the base 312 includes a pedestal 314, a fixing plate 315 for cylindrically fixing one of the end faces 201 of the cylindrical coil 200 supported by the pedestal 314 may further be provided, and the cylinder 313 penetrates and extends through a center of the fixing plate 315.

As shown in FIG. 8 and FIG. 10, the cylindrical coil may comprise lead wires 3001 connected to one of end faces 201, and the lid-type mount 300 may further comprise a channel 3200 leading to the second air space 20 for feeding or intaking the cooling medium or cooling air 80.

In one embodiment of the present invention, as shown in FIG. 8 and FIG. 9, the cup-type mount 400 is contructed with a support 420 including a center part 410 rotatably coupled to an end part 120 of a driveshaft 100, a bearing mechanism 411 rotatably supporting the end part 120 of the driveshaft 100 at the center part 410, and an outer cylindrical air-channel forming body 600 integrally formed with the support 420 or separately formed and integrally fixed to the support 420 which functions to close magnetic path, and, the support 420 may comprise an outer wall 412 and a cylinder 414, wherein, the bearing mechanism 411 may comprise a bearing 4110 which cooperates with each of the outer wall 412 and the cylinder 413.

Intermediate mount 1000, which a center part 1110 thereof is coupled to the intermediate part 110 of the driveshaft 100, may be configured to further comprise a cylinder part 1120 opposingly arranged to a cylinder 313 of the lid-type mount 300 through which the driveshaft 100 penetrates.

In one embodiment of the present invention, as shown in FIG. 8 and FIG. 9, magnets 4 equipped on an outer surface 520 of an inner cylindrical air-channel forming body 500 may be cuboid being shaped such that a long side corresponds to a length of the cylindrical coil 200 arranged in the first air space 40 and a short side is equipped along longitudinal direction with intervals 401 in circumferential direction of the cylindrical coil 200, wherein, each of the magnets 4 may be equipped with the interval 401 along longitudinal direction of the cylindrical coil 200.

In one embodiment of the present invention, as shown in FIG. 10, a stator 2 may further comprise an armor 9 having a protection cover 900 with a larger inner diameter than an outer diameter of the outer cylindrical air-channel forming body 600 which one of end faces 901 thereof is supported by the lid-type mount 300, wherein, the armor 9 may be provided with, in a part of the armor 9, outlets 90 for discharging the cooling medium or cooling air 80 discharged from the first air space 40, and an outlet 902 for lead wires 3001.

In one embodiment of the present invention, the outer cylindrical air-channel forming body 600 may also be provided with exhaust holes 660 at positions corresponding to each of intervals 401 of the cuboidal magnets 4 equipped along longitudinal direction of the cylindrical coil 200.

In one embodiment of the present invention, as shown in FIG. 11, a hollow body 1100 may be formed in the driveshaft 100 in a region penetrating through the lid-type mount 300 and the intermediate mount 1000 and in the intermediate part 110 of the driveshaft; the hollow body 1100 formed in a region penetrating through the lid-type mount 300 comprises an inlet 1110 in communication with a channel 3200 in the lid-type mount 300 for receiving the cooling medium or cooling air 80; the hollow body 1100 formed in the region penetrating through the intermediate mount 1000 comprises an outlet 1120 for discharging the cooling medium or cooling air 80; the inlet 1110 may be made in communication with a channel 3200 of the lid-type mount 300 and the outlet 1120 may be made in communication with a space 540 connected to a second air space 20, thereby not only the second air space 20 but also the entire interior of the coreless rotating electrical machine may be cooled.

In one embodiment of the present invention, the cylindrical coil 200 may be formed as laminate structure with a thickness of 5 mm or less, and the inner cylindrical air-channel forming body 500 and the outer cylindrical air-channel forming body 600 formed from any of magnetic yoke, ceramic or heat-resist resin may be used.

A fourth aspect of the present invention, as shown in FIG. 8, FIG. 9, relates to a cooling method for a coreless rotating electrical machine 10 comprising a stator including a cylindlical coil. That is, the present invention is a cooling method for a coreless rotating electrical machine 10 comprising:
a stator 2 in which a driveshaft 100 is rotatably coupled to a center part 310 of a lid-type mount 300 which fixes one of end faces 201 of an energizeable coreless cylindrical coil 200 cylindrically formed using a laminate structure consisting of a few overlapping conductive metal sheets in such a manner that each sheet is covered by insulting layer, with a plurality of line parts being spaced in longitudinal direction;
a rotor 3 consisting of an intermediate mount 1000 coupled to an intermediate part 110 of the driveshaft 100 which penetrates the center part 310 of the lid-type mount 300, an inner cylindrical air-channel forming body 500 integrally mounted to an outer surface 1200 of the intermediate mount 1000, and magnets 4 equipped on an outer surface 520 of the inner cylindrical air-channel forming body 500;
a second rotor 5 consisting of a cup-type mount 400 comprising an outer cylindrical air-channel forming body 600 which is constructed that it is opposingly positioned with respect to the lid-type mount 300 to form a first air space 40 which forms an air gap between an inner cylindrical air-channel forming body 500 and configured to close another end face 202 of the cylindrical coil 200 arranged in the first air space 40 leaving a clearance, wherein, the driveshaft 100 rotatably coupled to the center part 310 of the lid-type mount 300 is rotatably coupled to an end part 120 which penetrates a center part 1100 of the intermediate mount 1000;
a second air space 20 positioned on inner surface side 210 of the cylindrical coil 200, formed between ones of end faces 530, 630 of the inner cylindrical air-channel forming body 500 and the outer cylindrical air-channel forming body 600 and the lid-type mount 300; and a third air space 30 positioned on outer surface side 220 of the cylindrical coil 200.

The method comprises steps of:
operating a rotor 3 by energizing a cylindrical coil 200;
feeding or intaking cooling medium or cooling air 80 into a second air space 20;
directly cooling both surfaces of the cylindrical coil 200 with the cooling medium or cooling air 80; and
discharging the cooling medium or cooling air 80 after flowing through a first air space 40 from the coreless rotating electrical machine 10.

In one embodiment of the present invention, as shown in FIG. 8,
the lid-type mount 300 further comprises a channel 3200 leading to the second air space 20 positioned on inner surface side 210 of the cylindrical coil 200, wherein the method may further comprise a step of feeding or intaking the cooling medium or cooling air 80 into the second air space 20 from the channel 3200.

In one embodiment of the present invention, as shown in FIG. 10,
the stator 2 further comprises an armor 9 having a protection cover 900 with a larger inner diameter than an outer diameter of the outer cylindrical air-channel forming body 600 which one of end faces 901 thereof is supported by the lid-type mount 300, and the armor 9 may be provided with outlets 90 in a part of the armor 9, wherein, the method may further comprise a step of discharging the cooling medium or cooling air 80 discharged from the first air space 40 through the outlets 90.

In one embodiment of the present invention, as shown in FIG. 8, FIG. 9 and FIG. 10,
magnets 4 may be cuboid being shaped such that a long side corresponds to a length of the cylindrical coil 200 arranged in the first air space 40 and a short side is equipped along longitudinal direction with intervals 401 in circumferential direction of the cylindrical coil 200; a cup-type mount 400 may further be provided with exhaust holes 660 at positions in the outer cylindrical air-channel forming body 600 which correspond to each interval 401 of the magnets 4 with intervals equipped along longitudinal direction of the cylindrical coil 200, wherein, the method may further comprise a step of discharging the cooling medium or cooling air 80 fed into the first air space 40 from the third air space 30 and the exhaust holes 660 under differential pressure generated around the second rotor 5 by rotation thereof.

In one embodiment of the present invention, as shown in FIG. 11,
a hollow body 1100 may be formed in the driveshaft 100 in a region penetrating through the lid-type mount 300 and the intermediate mount 1000 and in the intermediate part 110 of the driveshaft; the hollow body 1100 formed in a region penetrating through the lid-type mount 300 comprises an inlet 1110 in communication with a channel 3200 in the lid-type mount 300 for receiving the cooling medium or cooling air 80; the hollow body 1100 formed in the region penetrating through the intermediate mount 1000 comprises an outlet 1120 for discharging the cooling medium or cooling air 80 wherein thereby, the method may further comprise a step of discharging the cooling medium or cooling air 80 via the inlet 1110 to the space 540 leading to the second air space 20 from the outlet 1120 so as to cool the interior of the coreless rotating electrical machine 10.

A fifth aspect of the present invention, as shown in FIG. 12, relates to a coreless rotating electrical machine 10 comprising:

a stator 2 in which a driveshaft 100 is rotatably coupled to a center part 310 of a lid-type mount 300 which fixes one of end faces 201 of an energizeable coreless cylindrical coil 200 cylindrically formed using a laminate structure consisting of a few overlapping conductive metal sheets in such a manner that each sheet is covered by insulting layer, with a plurality of line parts being spaced in longitudinal direction;
a rotor 3 consisting of a cup-type mount 400 comprising an outer cylindrical air-channel forming body 600 which is oppositely positioned with respect to the lid-type mount 300 coupled to an end part 120 of the driveshaft 100 which penetrates the center part 310 of the lid-type mount 300 and configured to close another end face 202 of the cylindrical coil 200 leaving a clearance; and magnets 4 equipped on an inner surface 610 of the outer cylindrical air-channel forming body 600;
a second rotor 5 consisting of an intermediate 1000 rotatably coupled, between the lid-type mount 300 and the cup-type mount 400, to an intermediate part 110 of the driveshaft 100 which penetrates the center part 310 of the lid-type mount 300; and an inner cylindrical air-channel forming body 500 integrally mounted to an outer surface 1200 of the intermediate mount 1000 and arranged to form a first air space 40 which forms an air gap between the outer cylindrical air-channel forming body 600 integrated with the cup-type mount 400;
a second air space 20 positioned on inner surface side 210 of the cylindrical coil 200 and formed between ones of end faces 530, 630 of the inner cylindrical air-channel forming body 500 and the outer cylindrical air-channel forming body 600 and the lid-type mount 300; and a third air space 30 positioned on outer surface side 220 of the cylindrical coil 200.

The coreless rotating electrical machine 10, as shown in FIG. 12, is further characterized in that
a means for feeding or intaking cooling medium or cooling air 80 into the second air space 20 is provided, in such a manner that the cooling medium or cooling air 80 is passed inside and outside of the cylindrical coil 200 arranged in the first air space 40 and is discharged from the third air space 30.

In one embodiment of the present invention, as shown in FIG. 12 and FIG. 13,
the lid-type mount 300 is constructed with a bearing mechanism 311 which rotatably supports the driveshaft 100 at the center part 310, a base 312 which cylindrically fixes one of end faces 201 of the cylindrical coil 200 including the center part 310, and a cylinder 313 extending from the base 312 including the center part 310, wherein, the bearing mechanism 311 may include a bearing 3110 which cooperates with each of the base 312 and the cylinder 313.

It may be constructed such that the base 312 comprises a pedestal 314, a fixing plate 315 for cylindrically fixing one of the end faces 201 of the cylindrical coil 200 supported by the pedestal 314 may further be provided, and the cylinder 313 penetrates and extends through a center of the fixing plate 315.

The cylindrical coil may comprise lead wires 3001 connected to one of end faces 201, and the lid-type mount 300 may further comprise a channel 3200 leading to the second air space 20 for feeding or intaking the cooling medium or cooling air 80.

In one embodiment of the present invention, as shown in FIG. 12 and FIG. 13,
the cup-type mount 400 may be constructed with; a support 420 including the center part 410 to which an end part 120 of the driveshaft 100 coupled; the outer cylindrical air-channel forming body 600 integrally formed with the support 420 or separately formed and integrally fixed to the support 420 to configure an outer cylinder of the cup-type mount 400; and magnets 4 equipped on an inner surface 610 of the outer cylindrical air-channel forming body 600.

Magnets 4 may be cuboid being shaped such that a long side corresponds to a length of the cylindrical coil 200 arranged in the first air space 40 and a short side is equipped along longitudinal direction with intervals 401 in circumferential direction of the cylindrical coil 200. The support 420 may comprise an outer wall 412 and a cylinder 413.

In one embodiment of the present invention, as shown in FIG. 12 and FIG. 13,
the intermediate mount 1000, to which the inner cylindrical air-channel forming body 500 working to close magnetic channel is integrally mounted, comprises a bearing mechanism 1110 which rotatably supports a center part 1100 at the intermediate part 110 of the driveshaft 100; a support 1120 including the center part 1100 which the inner cylindrical air-channel forming body 500 is integrally mounted to the outer surface 1200 thereof; and a cylinder 1130 extending along the driveshaft 100 from the support 1120, wherein, the bearing mechanism 1110 may further comprise a bearing 1111 which cooperates with each of the support 1120 and the cylinder 1130.

In one embodiment of the present invention, as shown in FIG. 13,
the magnets 4 equipped on an inner surface 610 of the outer cylindrical air-channel forming body 600 may be cuboid being shaped such that a long side corresponds to a length of the cylindrical coil 200 arranged in the first air space 40 and a short side is equipped along longitudinal direction with intervals 401 in circumferential direction of the cylindrical coil 200, and each of the magnets 4 may be equipped with the interval 401 along longitudinal direction of the cylindrical coil 200.

In one embodiment of the present invention, as shown in FIG. 14,
the stator 2 may further comprise an armor 9 having a protection cover 900 with a larger inner diameter than an outer diameter of outer cylindrical air-channel forming body 600 which one of end faces 901 thereof is supported by the lid-type mount 300, wherein, the armor 9 may be provided with, in a part of the armor 9, outlets 90 for discharging the cooling medium or cooling air 80 discharged from the first air space 40, and an outlet 902 for lead wires 3001.

In one embodiment of the present invention, as shown in FIG. 15,
the outer cylindrical air-channel forming body 600 configuring the cup-type mount 400 may further be provided with exhaust holes 660 at positions which correspond to each interval 401 of the magnets 4 equipped with intervals along longitudinal direction of the cylindrical coil 200.

The cup-type mount 400 may further be provided with a multi-vane centrifugal blowing rotating body 2000 fit into an outer cylindrical air-channel forming body 600 and configured like a water-turbine with two circular plates 2100 having a width corresponding to the third air space 30 and an outer exhaust hole 660 and with a plurality of vanes 2200 oriented to a shaft center of the circular plates 2100 and suspended on the two circular plates 2100, such that velocity of flow of the cooling medium or cooling air 80 in the first air space 40 is raised to improve cooling effect.

In one embodiment of the present invention, the cylindrical coil 200 may be formed as laminate structure with a thickness of 5 mm or less, and the inner cylindrical air-channel forming body 500 and the outer cylindrical air-channel forming body 600 formed from any of magnetic yoke, ceramic or heat-resist resin may be used.

A sixth aspect of the present invention, as shown in FIG. 12 and FIG. 1, relates to a cooling method for a coreless rotating electrical machine 10. That is, the present invention is a cooling method for a coreless rotating electrical machine 10 comprising:
a stator 2 in which a driveshaft 100 is rotatably coupled to a center part 310 of a lid-type mount 300 which fixes one of end faces 201 of an energizeable coreless cylindrical coil 200 cylindrically formed using a laminate structure consisting of a few overlapping metal sheets, in such a manner that each sheet is covered by insulting layer, with a plurality of line parts being spaced in longitudinal direction; a rotor 3 consisting of a cup-type mount 400 comprising an outer cylindrical air-channel forming body 600 which is opposingly positioned with respect to the lid-type mount 300 coupled to an end part 120 of the driveshaft 100 which penetrates the center part 310 of the lid-type mount 300 and configured to close another end face 202 of the cylindrical coil 200 leaving a clearance; and magnets 4 equipped on an inner surface 610 of the outer cylindrical air-channel forming body 600;
a second rotor 5 consisting of an intermediate 1000 rotatably coupled, between the lid-type mount 300 and the cup-type mount 400, to an intermediate part 110 of the driveshaft 100 which penetrates the center part 310 of the lid-type mount 300; and an inner cylindrical air-channel forming body 500 integrally mounted to an outer surface 1200 of the intermediate mount 1000 and arranged to form a first air space 40 which forms an air gap between the outer cylindrical air-channel forming body 600 integrated with the cup-type mount 400;
a second air space 20 positioned on inner surface side 210 of the cylindrical coil 200 and formed between ones of end faces 530, 630 of the inner cylindrical air-channel forming body 500 and the outer cylindrical air-channel forming body 600 and the lid-type mount 300; and a third air space 30 positioned on outer surface side 220 of the cylindrical coil 200.

The method comprises steps of:
operating the rotor 3 by energizing a cylindrical coil 200;
feeding or intaking cooling medium or cooling air 80 into a second air space 20;
directly cooling both surfaces of the cylindrical coil 200 with the cooling medium or cooling air 80; and
discharging the cooling medium or cooling air 80 after flowing through a first air space 40 from the coreless rotating electrical machine 10.

In one embodiment of the present invention, as shown in FIG. 12,
the lid-type mount 300 may further comprise a channel 3200 leading to the second air space 20 positioned on inner surface side 210 of the cylindrical coil 200, wherein, the method may further comprise a step of feeding or intaking the cooling medium or cooling air 80 into the second air space 20 from the channel 3200.

In one embodiment of the present invention, as shown in FIG. 13,
the magnets 4 may be cuboid being shaped such that a long side corresponds to a length of the cylindrical coil 200 arranged in the first air space 40 and a short side is equipped along longitudinal direction with intervals 401 in circumferential direction of the cylindrical coil 200, the cup-type mount 400 may further be provided with an exhaust hole 660 at positions in the outer cylindrical air-channel forming body 600 which correspond to each interval 401 of the magnets 4 equipped with intervals 401 along longitudinal direction of the cylindrical coil 200, wherein, the method may further comprise a step of discharging the cooling medium or cooling air 80 fed into the first air space 40 from the third air space 30 and the exhaust hole 660 under differential pressure generated around the rotor 3 by rotation thereof.

On the other hand, as shown in FIG. 14, the stator 2 may further comprise an armor 9 having a protection cover 900 with a larger inner diameter than an outer diameter of the outer cylindrical air-channel forming body 600 which one of end faces 901 thereof is supported by the lid-type mount 300, and the armor 9 may be provided with outlets 90 in a part of the armor 9, wherein, the method may further comprise a step of discharging the cooling medium or cooling air 80 discharged from the first air space 40 through the outlets 90.

The cup-type mount 400, as shown in FIG. 7, may further be provided with a multi-vane centrifugal blowing rotating body 2000 fit into an outer cylindrical air-channel forming body 600 and configured like a water-turbine with two circular plates 2100 having a width corresponding to the third air space 30 and an outer exhaust hole 660 and with a plurality of vanes 2200 oriented to a shaft center of the circular plates 2100 and suspended on the two circular plates 2100, and thereby, the method may further comprise a step of amplifying differential pressure generated around a rotor 3 by rotation thereof for discharging the cooling medium or cooling air 80 from the third air space 30 and the outer exhaust hole 660, such that velocity of flow of the cooling medium or cooling air 80 in the first air space 40 may be raised.

BRIEF DESCRIPTION OF THE DRAWINGS

FIG. 21 is a table showing measured values of a number of revolution (rpm), current (A), output (W), average temperature inside/outside of a cylindrical coil and efficiency (%) at a driving voltage of 24V; supplied flow of cooling air of 0 liter at a pressure of 0 kPa, 30 liters (stp)/min at 50 kPa, and 144 liters (stp)/min at 265 kPa; and torque (N·m) is varied from 0.10 to 0.95 (N·m).

FIG. 22 is a table showing measured values of a number of revolution (rpm), current (A), output (W), average temperature inside/outside of a cylindrical coil and efficiency (%) at a driving voltage of 48V; supplied flow of cooling air of 0 liter at a pressure of 0 kPa, 30 liters (stp)/min at 50 kPa, and 144 liters (stp)/min at 265 kPa; and torque (N·m) is varied from 0.10 to 1.05 (N·m).

BEST MODE FOR IMPLEMENTING THE INVENTION

Figure 1:
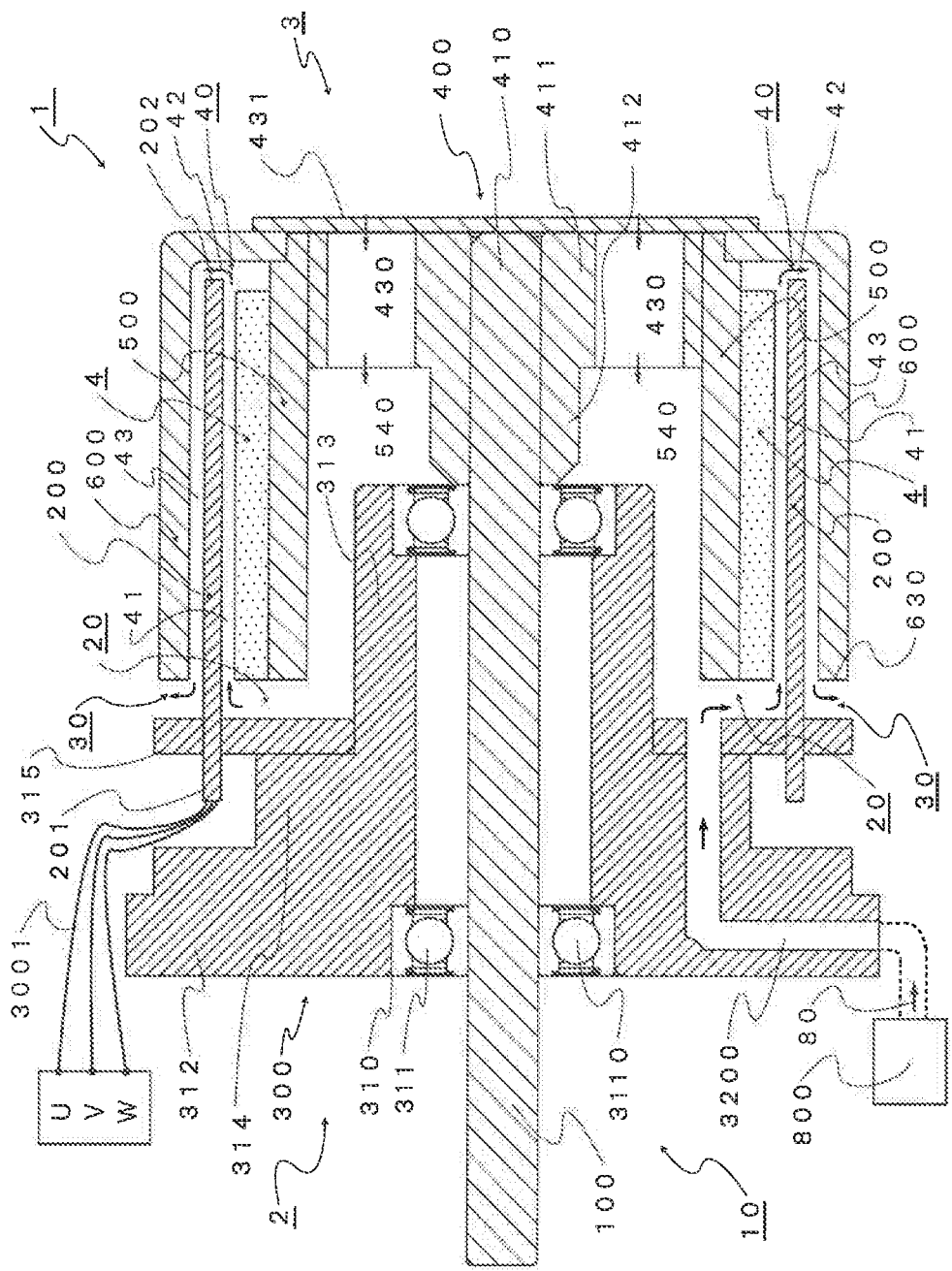
FIG. 1 is a schematic diagram showing a cross sectional view of a coreless rotating electrical machine comprising a stator including a cylindrical coil, which is one embodiment of the present invention.
Figure 2:
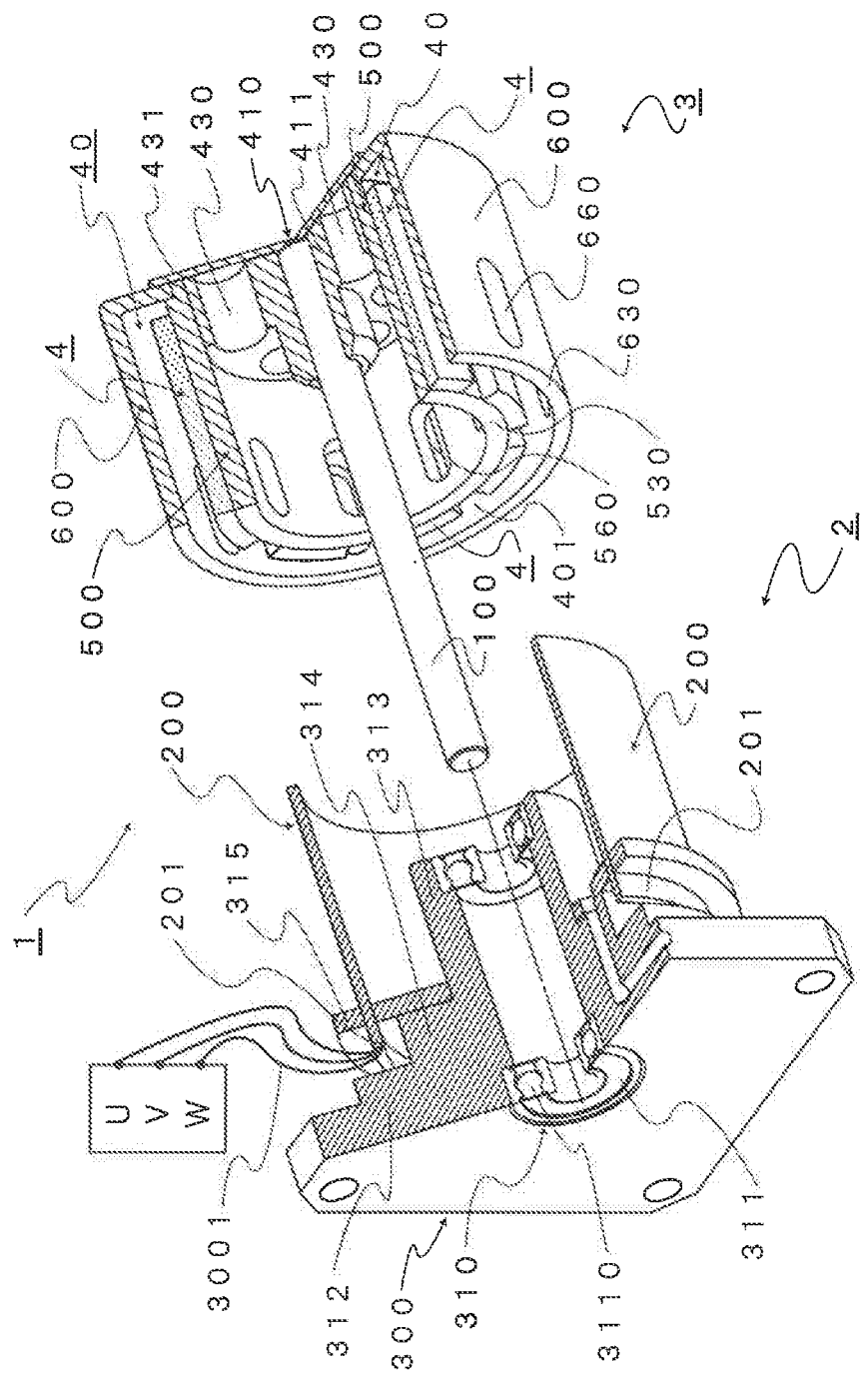
FIG. 2 is a perspective diagram of a partially cutout coreless rotating electrical machine shown in FIG. 1.
Figure 3:
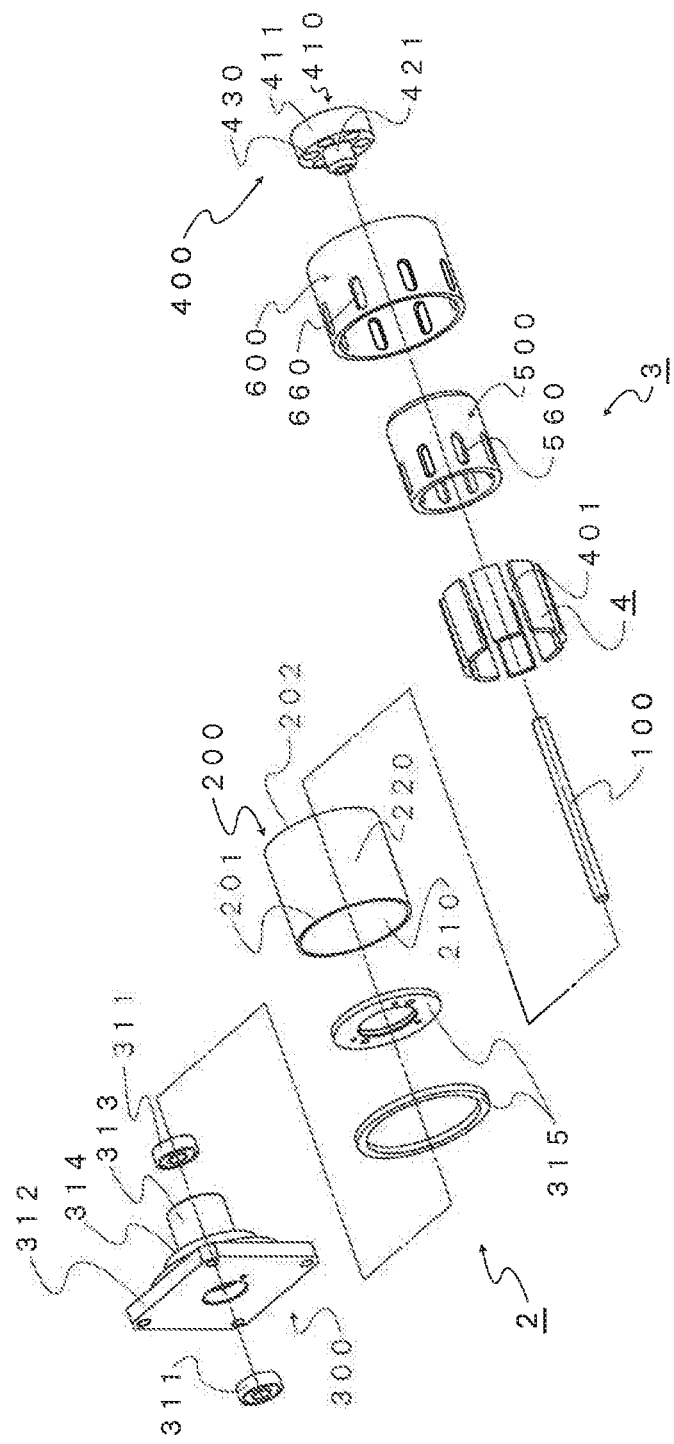
FIG. 3 is a schematic view showing a broken perspective view of components configuring a lid-type mount and a cup-type mount shown in FIG. 1.

Generated torque T (N·m), one of performance indications of a rotating electrical machine, is proportional to current intensity I (A) flowing in an armature coil and an output P (W) is calculated as a product of the torque T (N·m) and a rotation angular speed ω (rad/s). On the other hand, for voltage drop, a power source voltage (V) equals to a sum of a product of the current I (A) flowing in the armature coil and a resistance R (Ω) of the armature coil, and a counter electromotive force $E_0$ (V) which is induced electromotive force.

$$T = Kt \times I \quad (1)$$

$$P = T \times \omega \quad (2)$$

$$V = IR + E_0 \quad (3)$$

From the above equations, it is found as important to reduce the coil resistance in order to increase torque and output.

In this regard, a coreless rotating electrical machine comprising a stator including a cylindrical coil which characterizes the present invention as shown in FIG. 1 to FIG. 15 (hereinafter referred as "an electric motor of the present invention") is overviewed. A first feature of a basic structure is that the electric motor of the present invention uses a cylindrical coil formed using a laminate structure consisting of a few of conductive metal sheets as an energizeable coil body which configures a stationary armature. As a manufacturing method of the cylindrical coil, as described for example in Patent Document 7 and Patent Document 8, the cylindrical coil is formed using a few of conductive metal sheets, in such a manner that each sheet is covered by insulating layer, with a plurality of space linear parts being spaced in longitudinal direction, and preferably has a certain rigidity with a thickness of 5 mm or less.

A second feature of the basic structure is that the electric motor of the present invention has a structure as that one end face of the cylindrical coil is closed by an inner surface of a stator 2, and the other open end face of the cylindrical coil is inserted to a first air space which forms an air gap 40 in which a magnetic field with a donut-shape cross section, by an outer and an inner cylindrical air-channel forming body which configure a rotor 3 and consist of magnetic body where magnets 4, permanent magnets, are equipped (as one embodiment of these, hereinafter, an outer cylindrical air-channel forming body is referred as "an outer yoke" and an inner cylindrical air-channel forming body is referred as "an inner yoke").

More in detail, the cylindrical coil inserted into the air gap 40 is arranged as suspended in the air gap 40 with a little clearance such that the inner and the outer surface of the cylindrical coil does not contact with an inner surface of the outer yoke and the outer surface of the inner yoke and the open end face of the cylindrical coil does not contact with the inner surface of the rotor 3. In this regard, the electric motor of the present invention has a structure that the stator 2 and the rotor 3 are arranged on a driveshaft so that the cylindrical coil is arranged as such.

A third feature of the basic structure is that the electric motor of the present invention has a structure that a second air space 20 and a third air space 30 are formed by the stator 2, the cylindrical coil and the rotor 3. More in detail, the second air space 20 is formed, between the open end face of the outer yoke and the inner yoke integrated with the rotor 3 and the inner surface of the stator 2 which opposes to the end face, on an inner surface of the cylindrical coil closed by the inner surface of the stator 2, and is in communication with the air gap 40. The third air space 30 is formed between the air gap 40 and ambient air on the outer surface of the cylindrical coil closed by the inner surface of the stator 2.

Thus, the second air space 20 which is a closed space formed by the inner surface of the cylindrical coil and the inner surface of the stator 2 is in communication with the air gap 40, and is communicated via the inner surface of the rotor 3 only with the third air space 30 which is an open space formed by the outer surface of the cylindrical coil, the inner surface of the stator 2 and the open end of the outer yoke.

The electric motor of the present invention has a structure where at least the second air space 20 is in communication with ambient air via the third air space 30 with the open end of the outer yoke. Thus, differential pressure around the rotor generated by rotation of the rotor 3 creates negative pressure in the second air space 20. By intaking ambient air or feeding cooling medium or cooling air to the second air space 20, the intaken or fed cooling medium or cooling air traces the inner surface and the outer surface of the cylindrical coil when passing through the air gap 40 where a magnetic field is formed, and is then discharged from the open end of the outer yoke via the third air space 30.

It is clear that the electric motor of the present invention has an innovative technical feature as that the higher the speed of the rotor 3 i.e. the higher the output W, the higher the differential pressure around the rotor 3 and so is the cooling effect. This is derived from the basic structure of the electric motor of the present invention. That is, it is derived from the feature of the electric motor having a basic structure where a cylindrical coil, the cylindrical coil being a coreless coil without any iron loss which increases as rotational speed increases and having rigidity as formed with laminates of very thin metal sheets with a thickness of 5 mm or less, is inserted in a suspended state in a narrow air gap 40 with large magnetic flux density, and a second air space 20 in a closed space is communicated only with an open end of an outer yoke.

Figure 16:
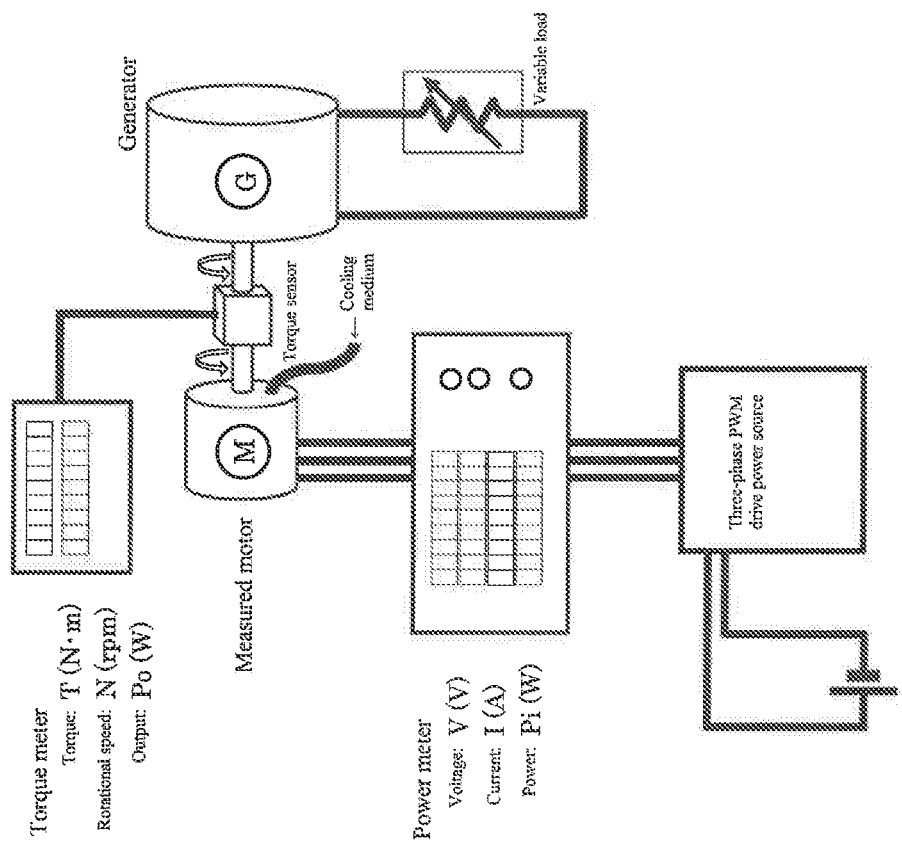
FIG. 16 is a schematic diagram of drive test based on one embodiment of a coreless rotating electrical machine.

A driving test of the electric motor of the present invention for evaluating performance is performed. FIG. 16 shows a schematic diagram of the driving test based on one embodiment (a prototype motor) of a coreless rotating electrical machine comprising a stator including a cylindrical coil shown in FIG. 17.

As is clear from a cross sectional view (a) and a perspective view (b) of a tested electric motor, the driving test is to determine efficiency of the motor by measuring output motive power generated by load torque and rotational speed, and input electric power (a three-phase PWM drive power, Ican·Tec BLD759) to the motor, under a setting as that an output shaft of the motor is coupled to a generator (CP8048 from M-Link Co., Ltd.) via a torque meter (TM301 from Unipulse) and electricity generated by the generator is consumed by an external variable resistor etc.

Since the input electric power to the motor varies depending on voltage and current supplied by a driving power source and power factor of driving state, the input power is measured with a power meter (PW33369 from Hioki E.E. Corporation) arranged between the motor driving power source and the motor. Measurement procedure started from driving the motor at a constant voltage V (V) from approximately no-load state where a generator load is nearly zero.

Load torque to the motor is increased by sequentially varying the external resistance of the generator to appropriately record current I (A), input power Pi (W), output power Po (W), torque T (N·m), and rotational speed N (rpm) to determine a ratio of input power to output power (Po/Pi) i.e. efficiency η.

Figure 17:
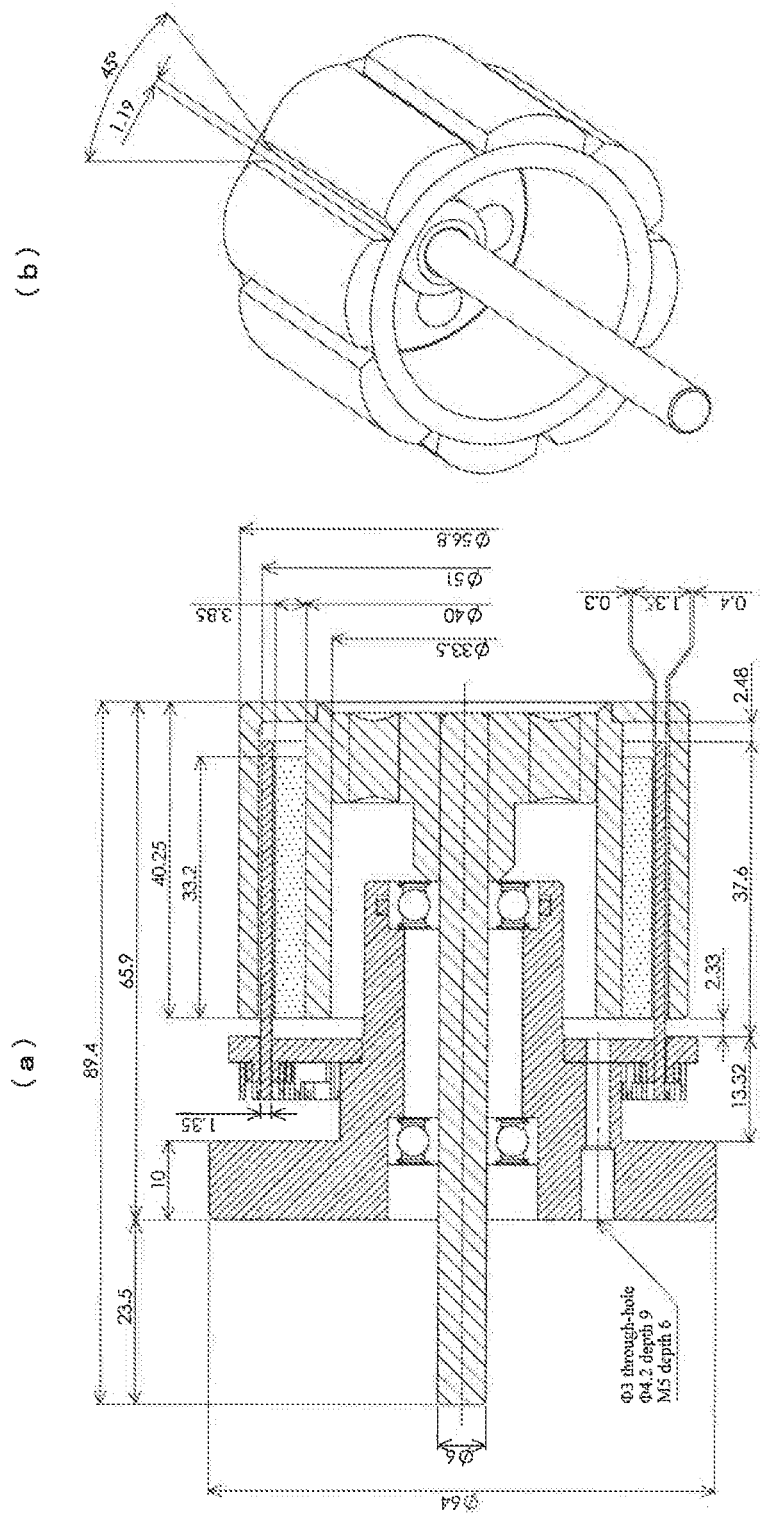
FIG. 17 is a cross sectional view (a) and a perspective view (b) of the tested rotating electrical machine shown in FIG. 16.

The cross sectional view (a) and the perspective view (b) of the tested electric motor shown in FIG. 17 are overviewed in the following. Firstly, a cylindrical coil with a thickness of 1.35 mm and an outer diameter of 51 mm is inserted to the air gap 40 which forms a first air space with a width of 11 mm and a longitudinal length of 37.75 mm. As shown in the perspective view (b) of FIG. 17, magnets 4 are 8-pole neodymium magnets configured as a cuboid with a thickness of 3.85 mm, and are equipped on an outer surface of an inner yoke with an interval of 1.19 mm in longitudinal direction.

Secondly, a second air space and a third air space with a width of 2.33 mm are formed between an open end face of an outer yoke and an inner yoke integrated with a rotor 3 and an inner surface of a stator 2 opposingly arranged to the end face, and a channel with an inner diameter 3 mm communicating with outside is arranged in the second air space which is a closed space for feeding cooling air.

Thirdly, as shown in the cross sectional view (a) of FIG. 17, a gap between an inner surface of a cylindrical coil and an outer surface of neodymium magnets 4 is only 0.3 mm and a gap between an outer surface of the cylindrical coil and an inner surface of an outer yoke is only 0.4 mm. Both gaps are narrow and their technical features will be described later.

In the driving test, a driving voltage is set at 24V and 48V by a driving power source, load torque (N·m) is sequentially varied with a variable load of a generator from 0.1 (N·m) which is an approximate no-load state of the generator, and change in driven rotational speed (rpm) and current (A) are measured, respectively, for a case (1) cooling air is not supplied by closing the channel with inner diameter of 3 mm which is in communication with outside; a case (2) cooling air of 30 liters (stp)/min at 1 atm., 20° C. is supplied by opening the channel; and a case (3) cooling air of 144 liters (stp)/min at 1 atm., 20° C. is supplied, to a second air space formed inside a cylindrical coil of the tested electric motor.

FIG. 22 is a comparative list based on the measured values. Air flow supplied to the second air space shown herein is a value converted to 1 atm. at 20° C. of air flow forcedly fed by a compressor, i.e., for each of a case (2) air flow of 20 liters (op)/min at 50 k Pa and a case (3) 40 liters (op)/min at 265 kPa.

Figure 18:
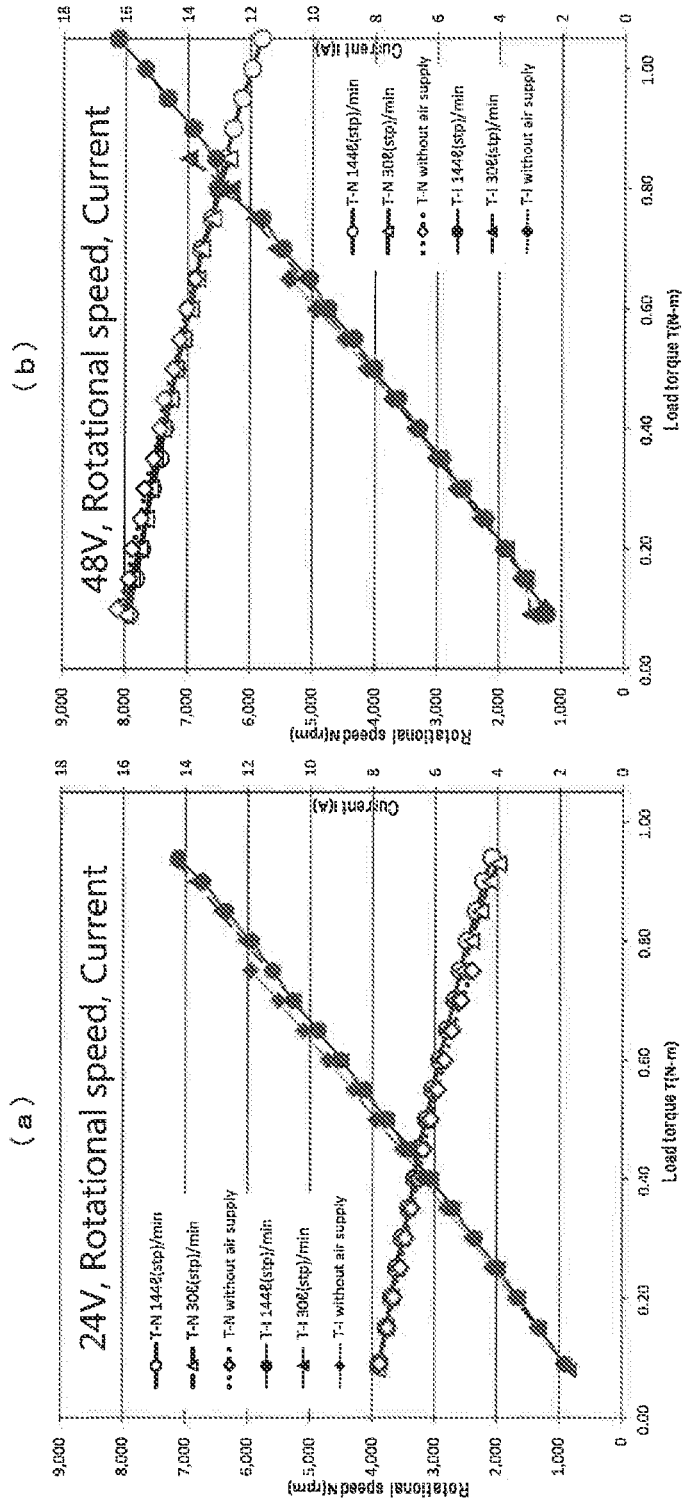
FIG. 18 is a comparative diagram showing measurement results of change of a number of revolution (rpm) and current (A) by varying torque (N·m) at a driving voltage of 24V and 48V, for a case (1) cooling air is not supplied; a case (2) cooling air of 30 liters (stp)/min at 1 atm., 20° C. is supplied; and a case (3) cooling air of 144 liters (stp)/min at 1 atm., 20° C. is supplied, to a second air space formed inside a cylindrical coil of the tested rotating electrical machine.

As is clear from FIG. 18, major difference was not generated in cases (1) to (3) even when the load torque was sequentially increased from 0.1 N·m to 0.65 N·m. More in detail, when the driving voltage was set at 24V, current in cases (1) to (3) varied between 9.8 A and 10.2 A, and rotational speed in cases (1) to (3) varied between 2700 rpm to 2800 rpm.

When the driving voltage was switched to 48 V, current in cases (1) to (3) varied between 10.2 A to 10.7 A which was not largely different from that at 24 V. Rotational speed at 48 V in any of cases (1) to (3) was 6900 rpm or less, whereas that at 24V was between 2700 and 2800 rpm, which was about 2.5 times larger than that at 24 V. But there was no major difference between the cases (1) to (3). In the equation (1), i.e., $$T = Kt \times I \tag{1}$$

since current (A) linearly increased as increase of load torque (N·m), it is confirmed that the equation (1) is established even when a driving voltage is varied and conditions are varied as in cases (1) to (3).

Figure 19:
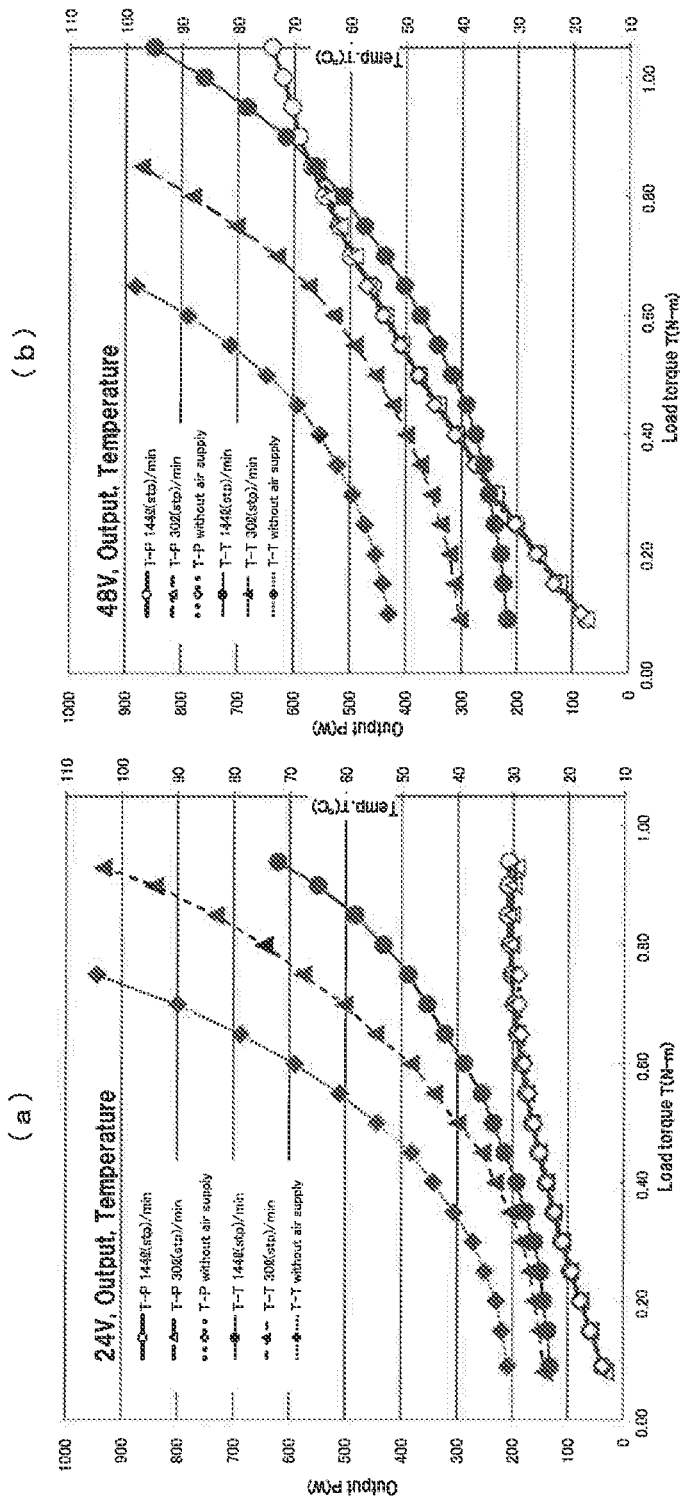
FIG. 19 is a comparative diagram showing measurement results of change of output (W) and temperature (° C.) by varying torque (N·m) at a driving voltage of 24V and 48V, for a case (1) cooling air is not supplied; a case (2) cooling air of 30 liters (stp)/min at 1 atm., 20° C. is supplied; and a case (3) cooling air of 144 liters (stp)/min at 1 atm., 20° C. is supplied, to a second air space formed inside a cylindrical coil of the tested electric motor.
Figure 20:
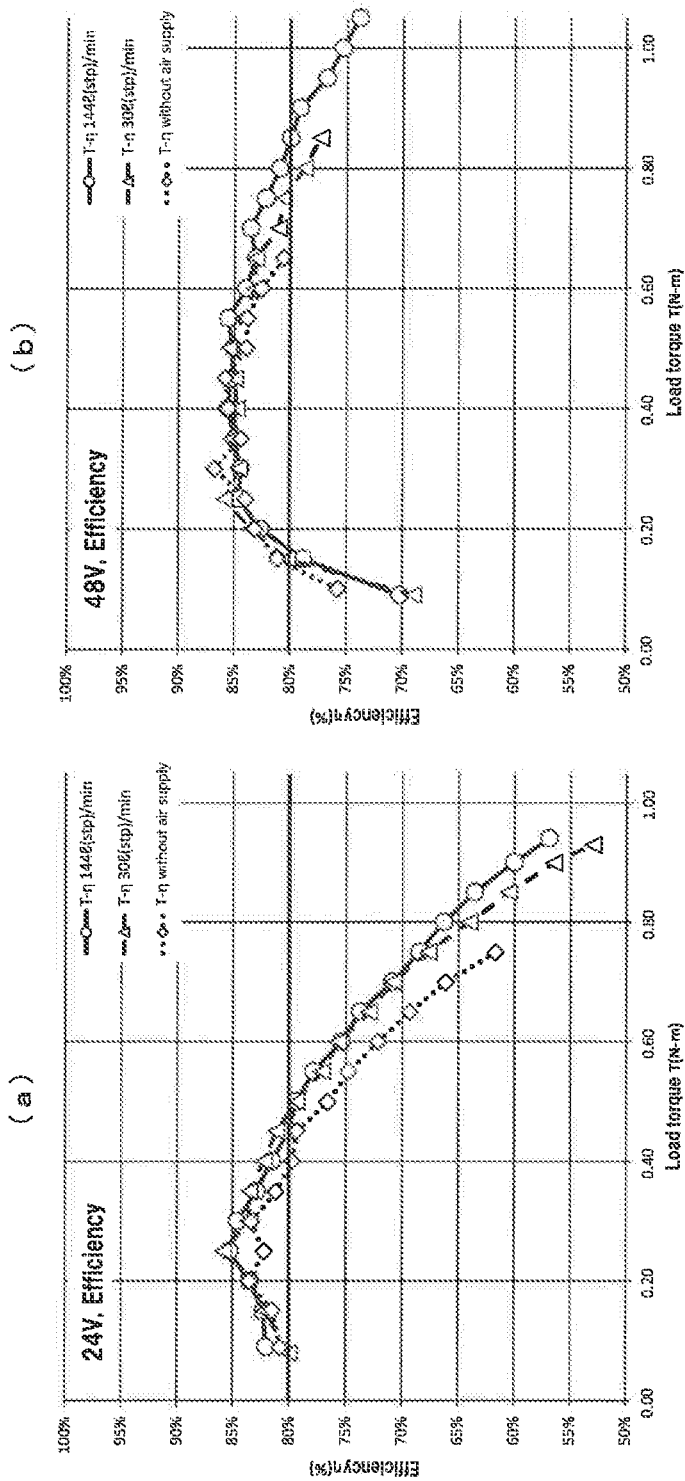
FIG. 20 is a comparative diagram showing measurement results of change of efficiency η (%) by varying torque (N·m) at a driving voltage of 24V and 48V, for a case (1) cooling air is not supplied; a case (2) cooling air of 30 liters (stp)/min at 1 atm., 20° C. is supplied; and a case (3) cooling air of 144 liters (stp)/min at 1 atm., 20° C. is supplied, to a second air space formed inside a cylindrical coil of the tested electric motor.

FIG. 19 and FIG. 20 compare measurement values for each of cases (1) to (3) in the driving test where the driving voltage was set at 24 V and at 48 V, the load torque (N·m) was varied in order to measure change of output motive power (W) and temperature (° C.) and change in efficiency η (%) as output motive power to input electric power for each of cases (1) to (3).

An electric motor is a device which converts electric power to motive power, i.e., electric energy to mechanical energy. On the other hand, a generator is for converting motive power to electric power. Since there is no structural difference between a motor and a generator, a motor and a generator are objects of the present invention. In a process of converting energy, various losses are generated and converted to heat. Losses generated in a general rotating electrical machine are classified as (i) copper loss, (ii) iron loss (hysteresis loss and eddy current loss), and (iii) mechanical loss, among which (i) copper loss and (ii) iron loss have a large share. Since the electric motor of the present invention comprising a stator including a cylindrical coil and a rotor 3 including an air gap 40 for inserting the cylindrical coil is coreless, (ii) iron loss is not generated, but eddy current loss is generated in a coil, which becomes a heat generating factor of the coil along with (i) copper loss. Then, a first technical problem to be solved by the present invention is to control heat generation of a cylindrical coil and a second technical problem is to restrict heating of magnets so that coercive force of cuboid magnets equipped on an outer surface of an inner yoke in longitudinal direction of the air gap 40 is not deteriorated by heating.

When deterioration of coercive force of magnets caused by heating is further considered, although downsizing of electric motors is requested in many applications, it is difficult to raise magnetic flux density with magnets of same material. However, only changing conventional ferrite magnets to rare-earth magnets, such as neodymium magnets, allows for raising torque of an electric motor of a same size (see page 53 of Non Patent Document 1). When a neodymium magnet, which the main components thereof are neodymium which is a rare-earth, iron, and boron, is further considered, it has very strong magnetic force, but since deterioration of coercive force induced by heat is large, its use is limited below 80° C. (see page 27 of Non Patent Document 1). Permanent magnets used in the driving test are neodymium magnets, but since they are heat-resist type, they may be used below 120° C. It is preferable that the magnets 4 to be used for the electric motor of the present invention are heat-resist neodymium magnets.

FIG. 19 clearly shows that, in a case (1) i.e. when load torque was increased to 0.65 N·m while a channel communicating with outside was closed and cooling air was not supplied, an average surface temperature of a cylindrical coil reached to 80° C. at a driving voltage of 24 V, and the average surface temperature reached to 100° C. at a driving voltage of 48 V. Even if the load torque is raised while the driving voltage is set at a same condition, it not only deteriorates coercive force of the magnets 4, but also increases resistance R of the cylindrical coil due to heat generation, which in turn reduces rotational speed, and output corresponding to the load torque may not be obtained.

However, in a case (2) i.e. when cooling air of 30 liters/min was supplied, it was possible to raise the load torque at the driving voltage of 24 V to 0.85 N·m before the average surface temperature of the cylindrical coil exceeded 80° C. to obtain an output of 203 W. In a case (3) i.e. when cooling air of 144 liters/min was supplied, the average surface temperature of the cylindrical coil did not exceed 80° C. even when the load torque exceeded 0.95 N·m. When the driving voltage was switched to 48V, in the case (2), the load torque at which the average surface temperature of the cylindrical coil exceeded 80° C. was 0.75 N·m and the output was 519 W, and in the case (3), the load torque was 1.00 N·m and the output was 621 W.

When a driving voltage is set high, a rotational speed (rpm) naturally increases, and an output (W) increases. The higher an output (W) is, the higher a calorific value (J/m$^3$) of a cylindrical coil becomes, and thereby a resistance R of the cylindrical coil naturally increases. FIG. 18 and FIG. 19 clearly show that, in the cases (2) and (3), the calorific value of the surface of the cylindrical coil is reduced by the cooling air than in the case (1), and thus, the temperature rise of the coil is restricted and the output (W) is not so much affected. Effect of the cooling air is more obvious in the case (3) than in the case (2).

Degree of output may be used as one of scales to evaluate performance of an electric motor. In this regard, when a driving voltage was set at 48 V, the load torque in the case (1), when the average surface temperature of a cylindrical coil was 80° C. without the cooling air, was 0.55 N·m and the output was 410 W. On the other hand, the load torque in the case (2), when the average surface temperature of a cylindrical coil was 80° C. with the cooling air of 30 liters (stp)/min, was 0.75 N·m (1.36 times larger than that in the case (1)) and the output was 517 W (1.27 times larger than that in the case (1)). The load torque in the case (3), when the average surface temperature of a cylindrical coil was 80° C. with the cooling air of 144 liters (stp)/min, was 0.95 N·m (1.73 times larger than that in the case (1)) and the output was 604 W (1.43 times larger than that in the case (1)).

Ratio of output motive power to input electric power (Po/Pi), i.e. efficiency η may be used as another scale to evaluate performance of an electric motor. The higher the driving voltage is set, the larger the difference of performance becomes. FIG. 20 shows change of efficiency η for the cases (1) to (3) when the driving voltage was set at 24V and switched to 48V.

When efficiency η of an electric motor is desirable to be 80% or higher, there was no major difference in the efficiency η for the cases (1) to (3) at the driving voltage of 24V. More specifically, the load torque in the cases (1) to (3), when the efficiency η exceeded 80%, was about 0.50 N·m and the output ranged between 137 and 153 W, which did not show any major difference in performance of an electric motor. As is clear from a table shown in FIG. 21, the efficiency η of the electric motor stayed below 80% at the load torque described in the above even if cooling air was supplied to cool the cylindrical coil as in the cases (2) and (3).

However, when the driving voltage was set at 48 V, two times of 24V, a large difference was generated in the efficiency η for the cases (1) to (3). In the case (1), the average surface temperature of a cylindrical coil was 100° C. which was close to critical point, but the efficiency η of the electric motor remained at 80%. At this point, the load torque was 0.65 N·m and the output was 470 W, which may be evaluated as indicating assured performance based on the basic structure of the electric motor of the present invention. As is clear from a table shown in FIG. 22, the efficiency η in the case (2) was reduced below 80% when the load torque was 0.80 N·m and the output was 537 W, and the efficiency η in the case (3) was reduced below 80% when the load torque was 0.90 N·m and the output was 592 W, and the average surface temperature of a cylindrical coil when the efficiency η was reduced below 80% was maintained at 88° C. in the case (2), and at 71° C. in the case (3) which did not reach to 80° C.

Features of the electric motor of the present invention may be clarified by performing a similar performance test as the above while sequentially raising a driving voltage, for example, from 24V, to 36V, 48V and 60V. The features of the electric motor of the present invention may be easily estimated from the result of the driving test in the above. In order to solve the previously described technical problem, several attempts, such as intaking ambient air to the electric motor described in Patent Document 5 and Patent Document 6 to cool surface of magnets and to cool coil surface of windings, have been made but has not led to any drastic solution. The present invention is an electric motor developed in challenging such technical problem.

Thus, as shown in FIG. 1, cooling effect may further be improved not only by providing a channel 3200 which communicates with ambient air on a lid-type mount 300 which constructs a stator 2, but also by providing a vent hole 430 for intaking ambient air through a filter 431 under differential pressure around a rotor 3 generated by rotation of the rotor 3 on a cup-type mount 400 of the rotor 3.

Figure 4:
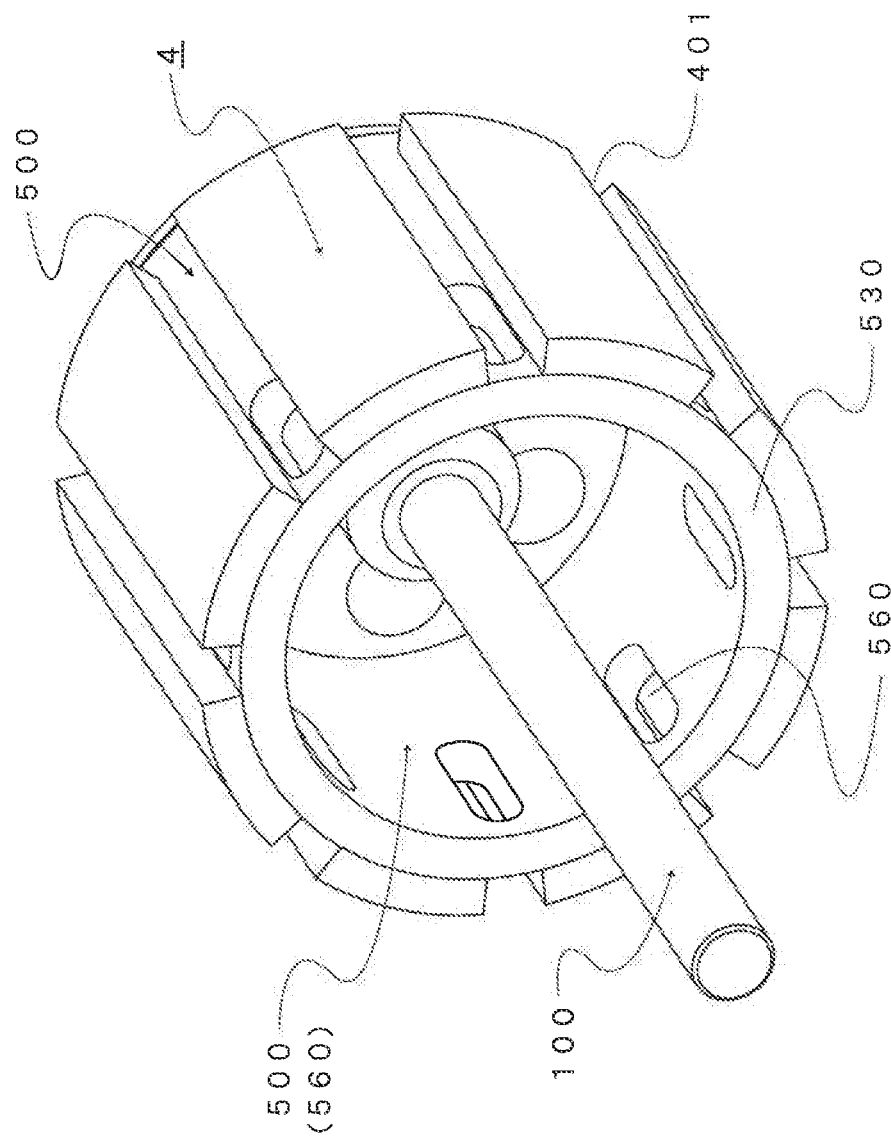
FIG. 4 is a schematic diagram showing a perspective view of an inner cylindrical air-channel forming body to which magnets are equipped with intervals in circumferential direction.

Further, FIG. 4 shows a fourth feature of the basic structure is that the electric motor of the present invention. As shown in the schematic view of FIG. 17 (*b*) which indicates the electric motor used in the driving test, the cuboid neodymium magnets bonded on the surface of the inner yoke along longitudinal direction of the driveshaft are equipped with small intervals, for example, of 1.19 mm.

The neodymium magnets, in brief, correspond to 8-pole magnets 4 bonded by using epoxy adhesive agent to follow a contour of the surface of the inner yoke and further fixed with polyamide resin etc. The interval of 1.19 mm corresponds to an interval 401 between each of magnets 4, and allows for propelling effect of vane, i.e. for improving suction force by raising flow velocity of cooling medium or cooling air 80 when the cooling medium or cooling air 80 supplied to a second air space 20 passes through an air gap 40 of a first air space.

Figure 5:
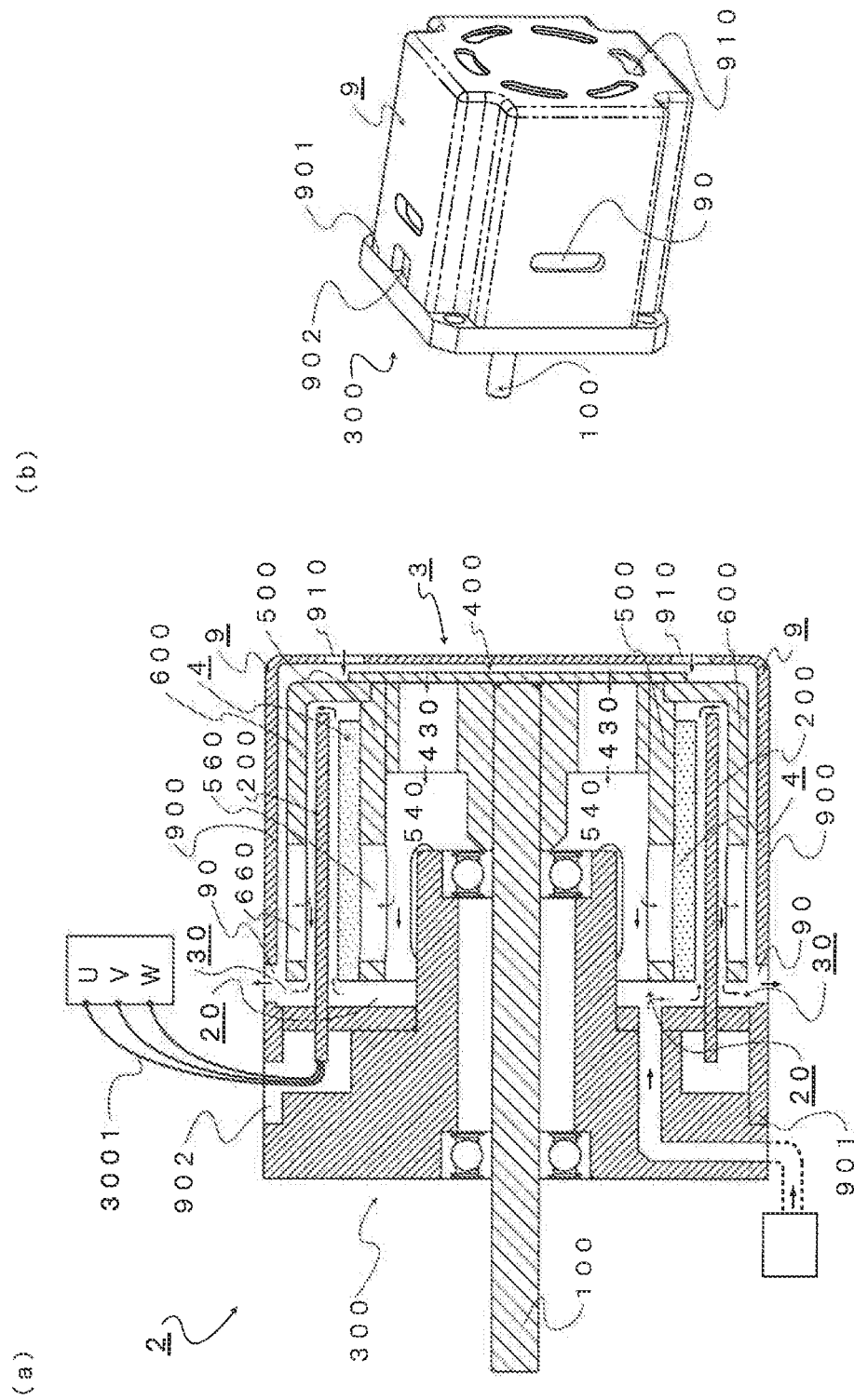
FIG. 5 is a schematic diagram showing a cross sectional view (a) and a perspective view (b) of the coreless rotating electrical machine shown in FIG. 1 to which an armor having a protection cover is mounted.
Figure 6:
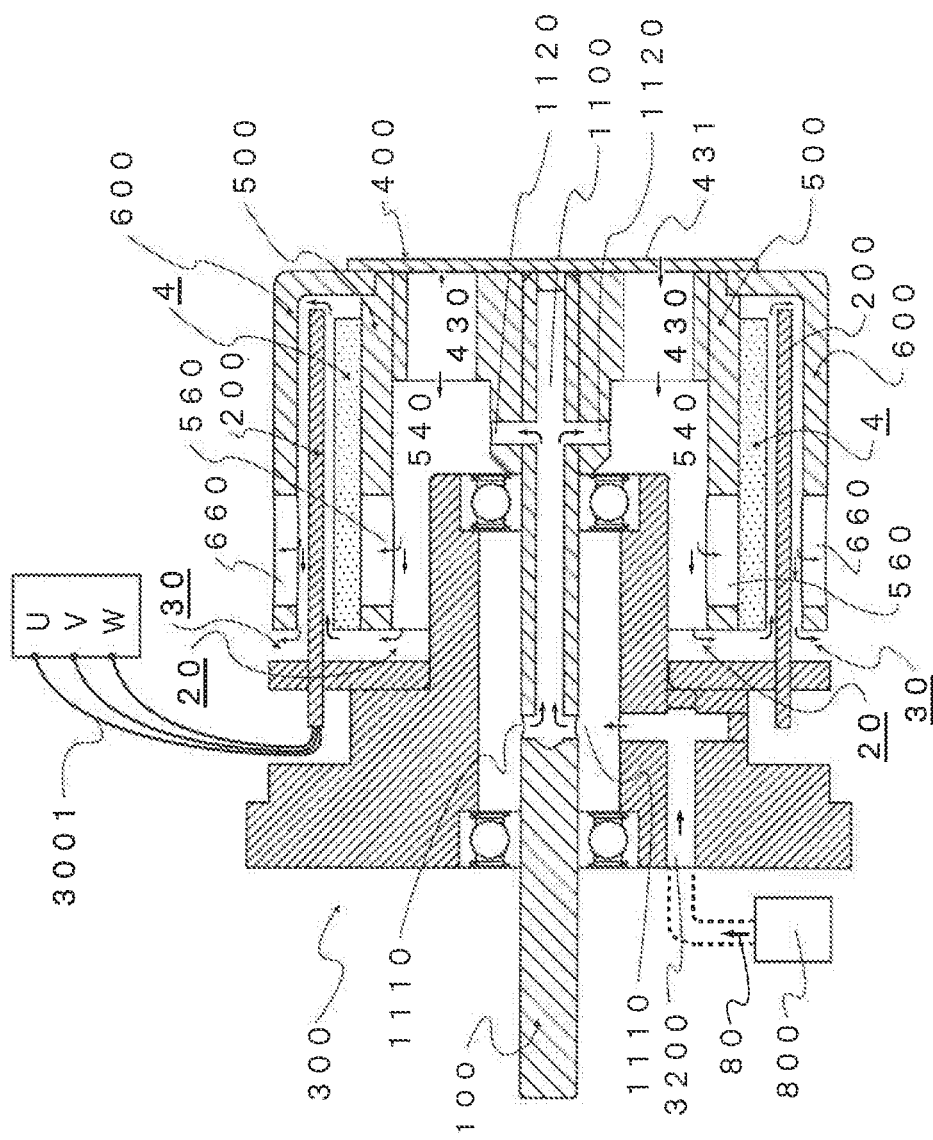
FIG. 6 is a schematic diagram showing a cross sectional view of a driveshaft of the coreless rotating electrical machine shown in FIG. 1 of which a part is formed as a hollow body.
Figure 7:
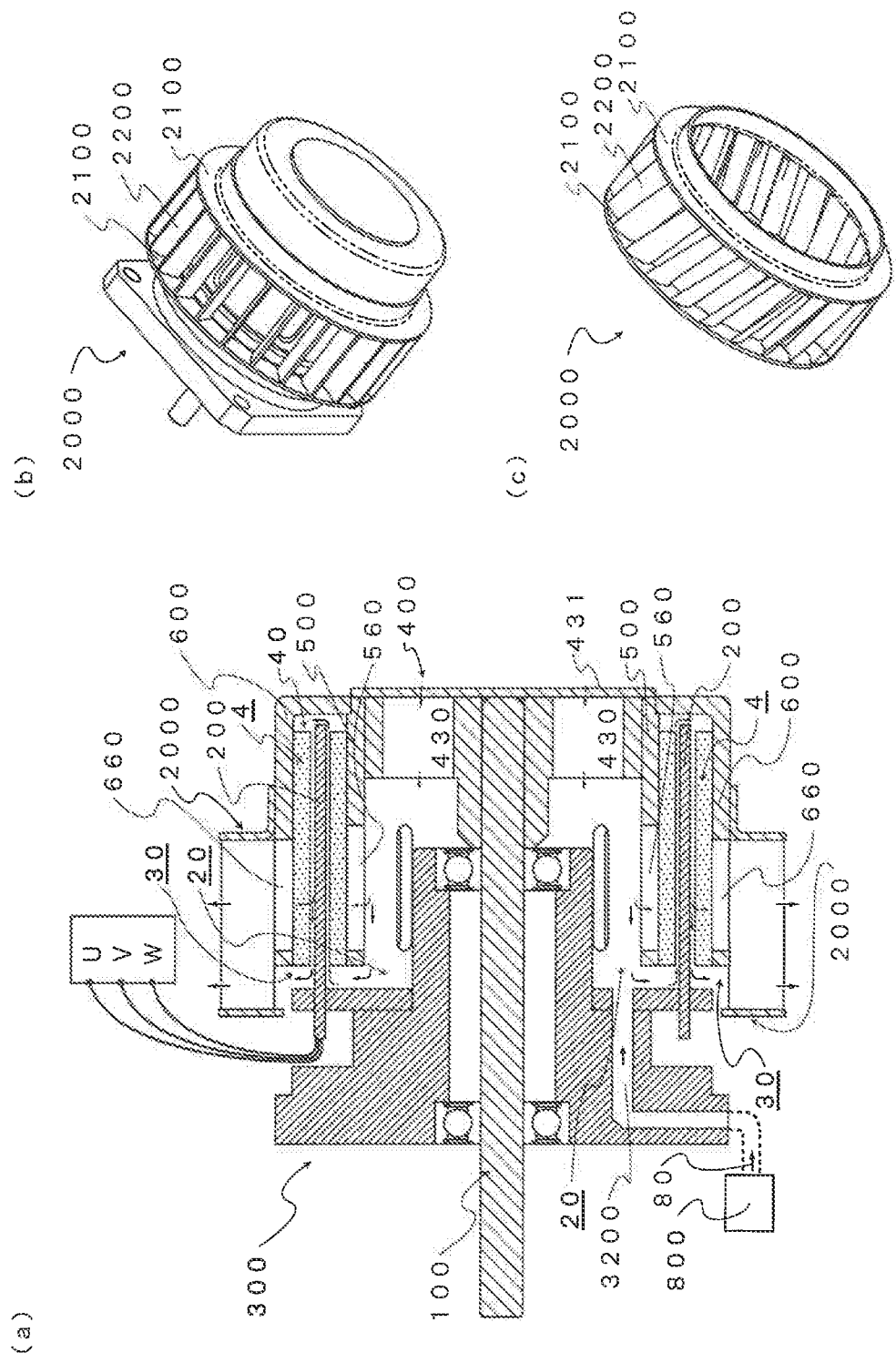
FIG. 7 is a schematic diagram showing a cross sectional view (a) and a perspective view (b) (c) of the coreless rotating electrical machine shown in FIG. 1 to which a multi-vane centrifugal blowing rotating body is fit.

FIG. 5 to FIG. 7 show a further improved motor based on the basic structure of the electric motor of the present invention. FIG. 5 shows, as is clear from the perspective view (b), that an armor 9 having a protection cover 900 is mounted to the electric motor of the present invention shown in FIG. 1 to prevent entry of foreign item from outside. FIG. 6 shows that a part of a driveshaft 100 of the electric motor of the present invention shown in FIG. 1 is formed as a hollow body 1100, the cooling medium or cooling air 80 is supplied to the second air space 20 through the hollow body 1100 to cool the entire interior of the electric motor closed by a cylindrical coil 200.

Further, FIG. 7 shows that a multi-vane centrifugal blowing rotating body 2000 is fit, which cooperates with inner exhaust holes 560 and outer exhaust holes 660 at positions corresponding to respective intervals 401 of the magnets 4 provided on an inner yoke 500 and an outer yoke 600 of the coreless rotating electrical machine shown in FIG. 1 and FIG. 4 to improve cooling effect for the cylindrical coil 200 and the magnets 4.

When a cooling method of an electric motor which is a second aspect of the present invention is considered, the cooling method is found as comprising steps of: activating a rotor 3 by energizing a cylindrical coil 200; feeding or intaking cooling medium or cooling air 80 to a second air space 20; directly cooling an inner surface and an outer surface of the cylindrical coil 200 by the cooling medium or cooling air 80; and discharging the cooling medium or cooling air 80 passed through a first air space 40 from the electric motor.

As shown in FIG. 1, the cooling method may further comprise steps of: providing, on a lid-type mount 300, a channel 3200 leading to a second air space 40 positioned on inner surface side 210 of a cylindrical coil 200 to feed or intake the cooling medium or cooling air 80 to the second air space 20 from the channel 3200; and/or, drilling a vent hole 430 on an outer surface of a rotor 3 for intaking ambient air to a space 540 leading to the second air space 20 on the inner surface side of an inner yoke 500 and providing a filter 431 covering the vent hole 430 and intaking ambient air simultaneously as sucking the cooling medium or cooling air 80 fed to the second air space 20 by a first air space 40. In addition, as the cooling method has an advantage as that the higher the rotational speed is, the less debris adheres to the filter 431, it may further improve cooling effect of interior of the electric motor.

As shown in FIG. 4, FIG. 5 and FIG. 7, the cooling method of the electric motor, which is the second aspect of the present invention, may further comprise a step of further providing, on a cup-type mount 400, inner exhaust holes 560 on an inner yoke 500 and/or outer exhaust holes 660 on an outer yoke 600 at positions corresponding to the intervals 401 of the magnets 4 equipped with the intervals 401 along longitudinal direction of the cylindrical coil 200 to discharge cooling medium or cooling air 80 fed into a first air space 40 from a third air space 30 and the outer exhaust holes 660 under differential pressure around a rotor 3 generated by rotation of a rotor 3, such that cooling effect by the cooling medium or cooling air 80 is further improved.

The cooling method of the electric motor may comprise a step of further amplifying differential pressure around a rotor 3 generated by rotation of the rotor 3 for discharging the cooling medium or cooling air 80 from a third air space 30 and the exhaust holes 660, by providing with a multi-vane centrifugal blowing rotating body 2000 fit into an outer yoke 600 and configured like a water-turbine with two circular plates 2100 having a width corresponding to the third air space 30 and the outer exhaust holes 660 and with a plurality of vanes 2200 oriented to a shaft center of the circular plates 2100 and suspended on the two circular plates 2100, such that velocity of flow of the cooling medium or cooling air 80 in the first air space 40 may be raised.

Next, as an improved electric motor of the present invention, an electric motor which is a third aspect and a fourth aspect of the present invention is considered based on FIG. 8 to FIG. 11. Structure of a lid-type mount 300 configuring a stator 2 is not different from that of the electric motor of the first aspect.

A difference between the improved electric motor and the electric motor of the first aspect is that a rotor 3 is configured with a rotor 3 in which an intermediate mount 100 including an inner yoke 500 with magnets 4 equipped on an outer surface is coupled to a driveshaft 100, and a second rotor in which a cup-type mount 400 including an outer yoke 600, which forms a first air space i.e. an air gap 40 with the inner yoke 500 to work to close magnetic channel, is rotatably coupled with the driveshaft which penetrates the intermediate mount 1000.

When the electric motor is started up by energizing a cylindrical coil 200, a rotor 3 firstly starts rotating. Next, as a second rotor 5 cooperates with a rotor 3 to form magnetic field, the second rotor 5 follows rotation of the rotor 3 and starts rotation with a little delay. When the electric motor reaches steady state, the rotor 3 and the second rotor 5 synchronously rotate. Thus, since the rotor 3 of the electric motor is separately configured from the outer yoke 600, it has a technical feature that inertia of the rotor 3 at startup and/or shutdown is smaller than that of the electric motor of the first aspect. However, it is structurally not possible to provide a vent hole 430 on a cup-type mount 400 configuring a second rotor 5, for intaking ambient air to a space 540 leading to a second air space 20 on an inner surface side of the inner yoke 500.

Figure 8:
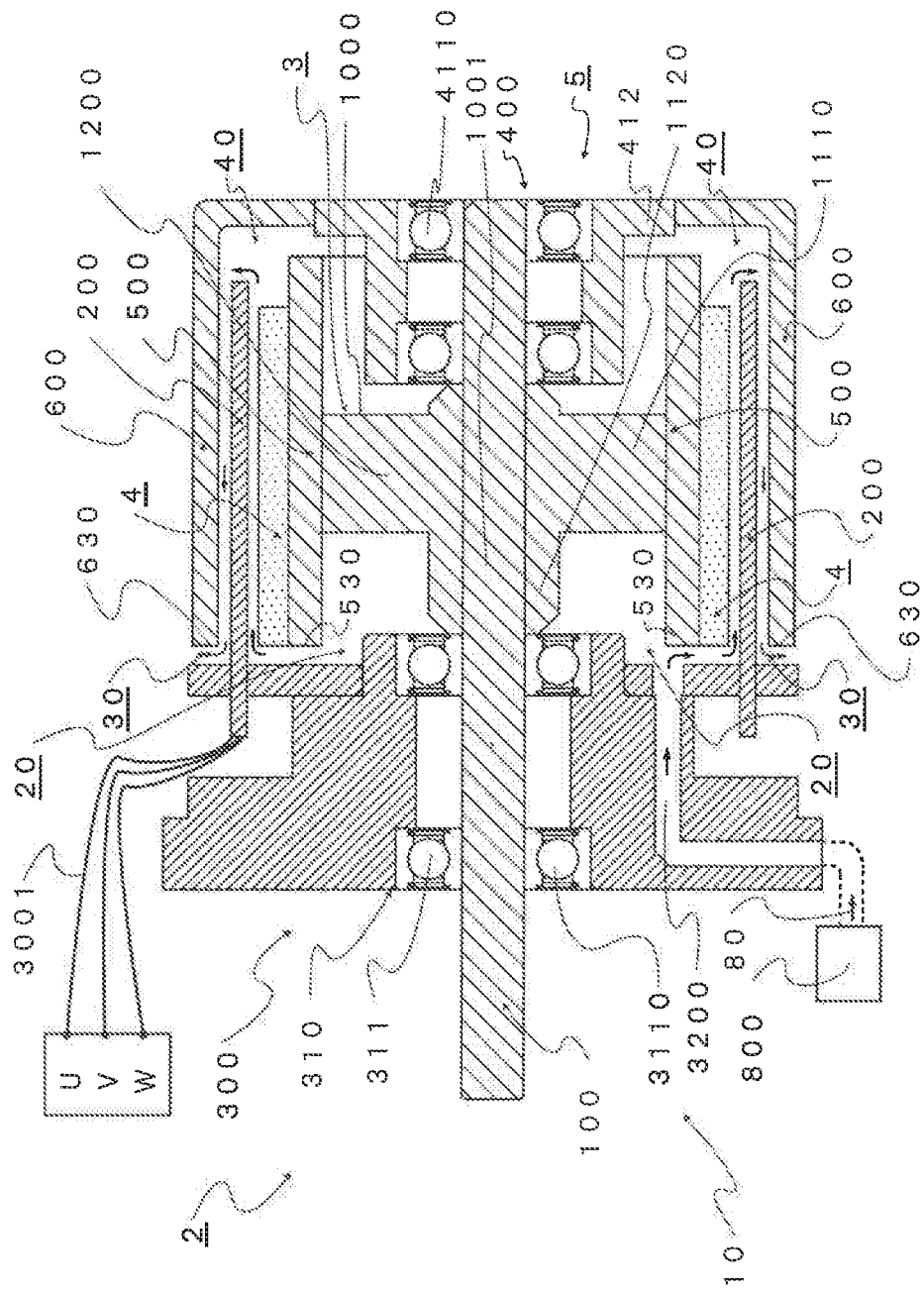
FIG. 8 is a schematic diagram showing a cross sectional view of a coreless rotating electrical machine comprising a stator including a cylindrical coil, which is another embodiment of the present invention.
Figure 9:
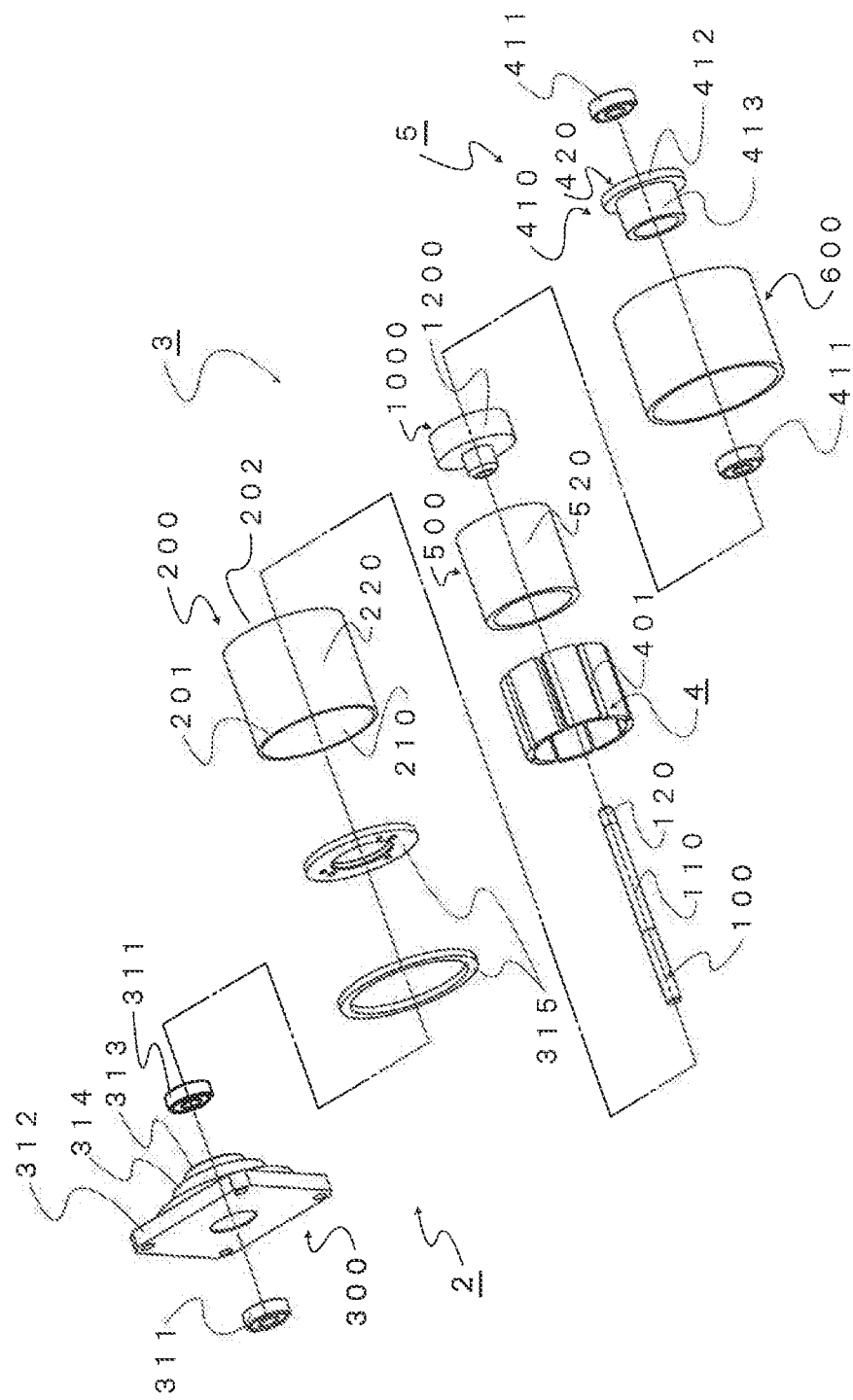
FIG. 9 is a schematic diagram showing a broken perspective view of components configuring a lid-type mount, an intermediate mount and a cup-type mount shown in FIG. 8.
Figure 10:
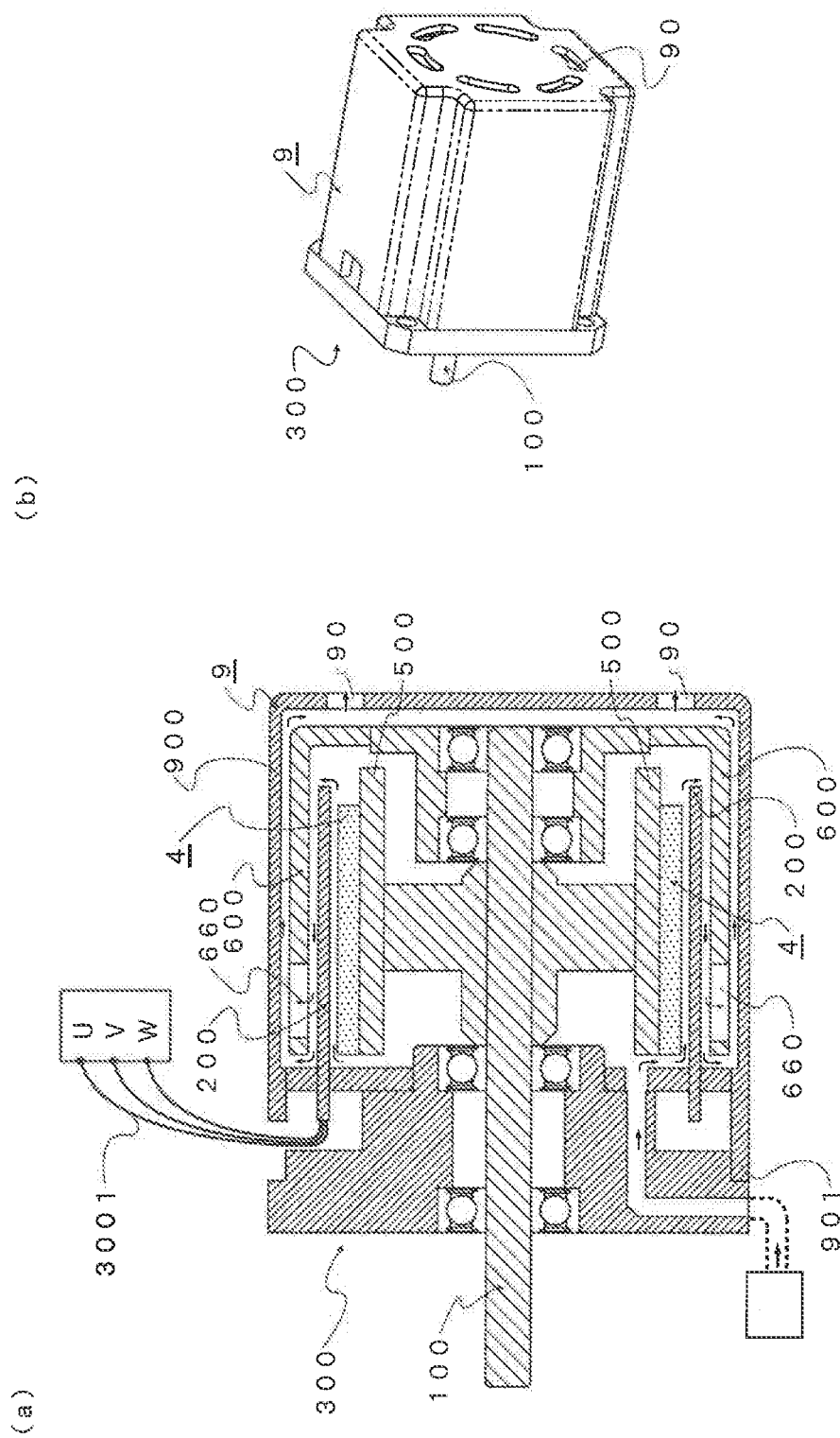
FIG. 10 is a schematic diagram showing a cross sectional view (a) and a perspective view (b) of the coreless rotating electrical machine shown in FIG. 8 to which an armor having a protection cover is mounted.
Figure 11:
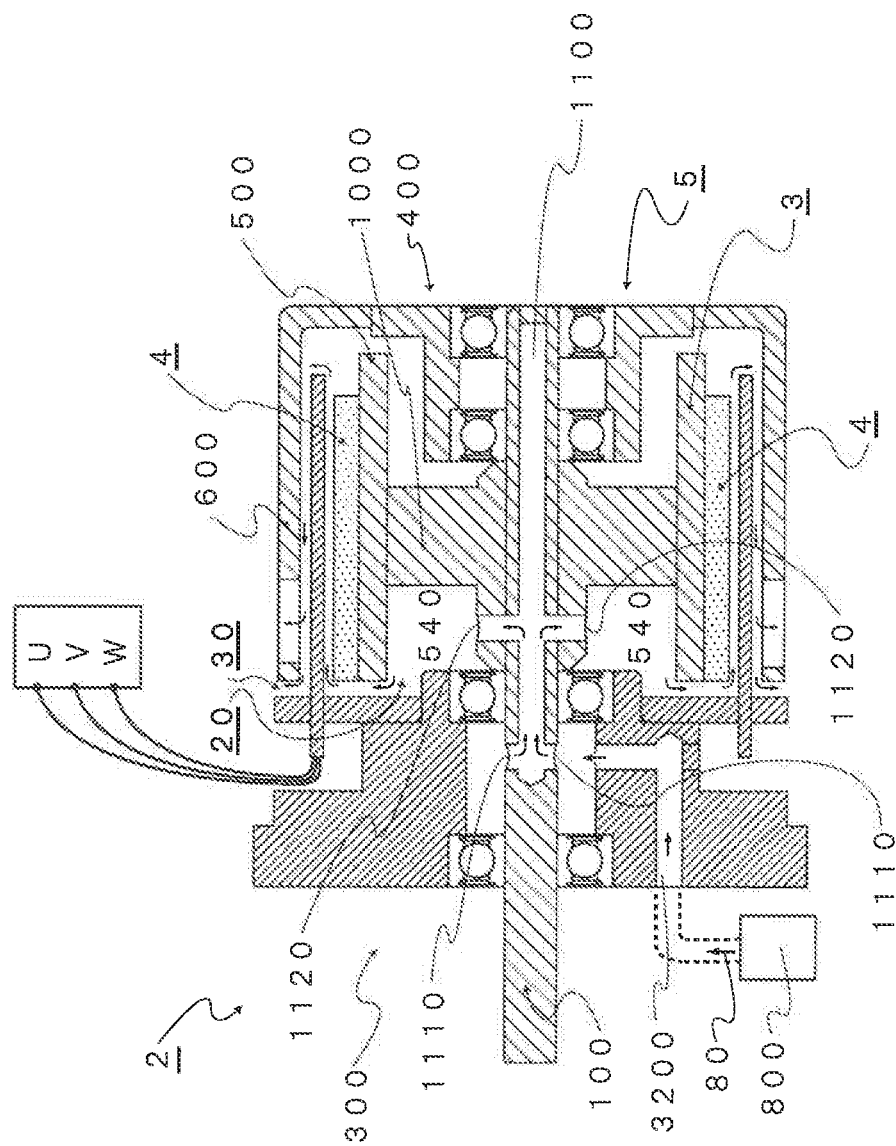
FIG. 11 is a schematic diagram showing a cross sectional view of a driveshaft of the coreless rotating electrical machine shown in FIG. 8 of which a part is formed as a hollow body.
Figure 12:
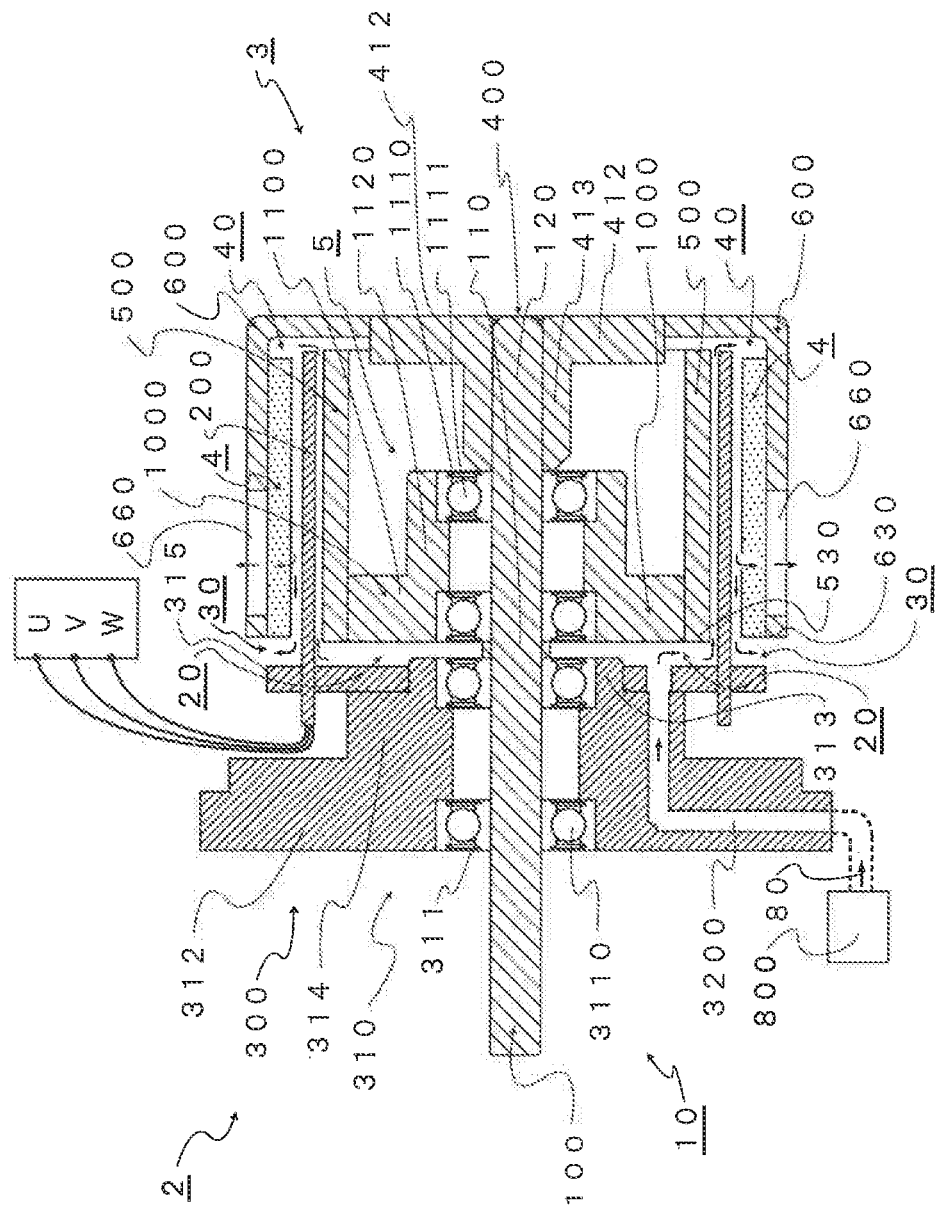
FIG. 12 is a schematic diagram showing a cross sectional view of a coreless rotating electrical machine comprising a stator including a cylindrical coil, which is further embodiment of the present invention.
Figure 13:
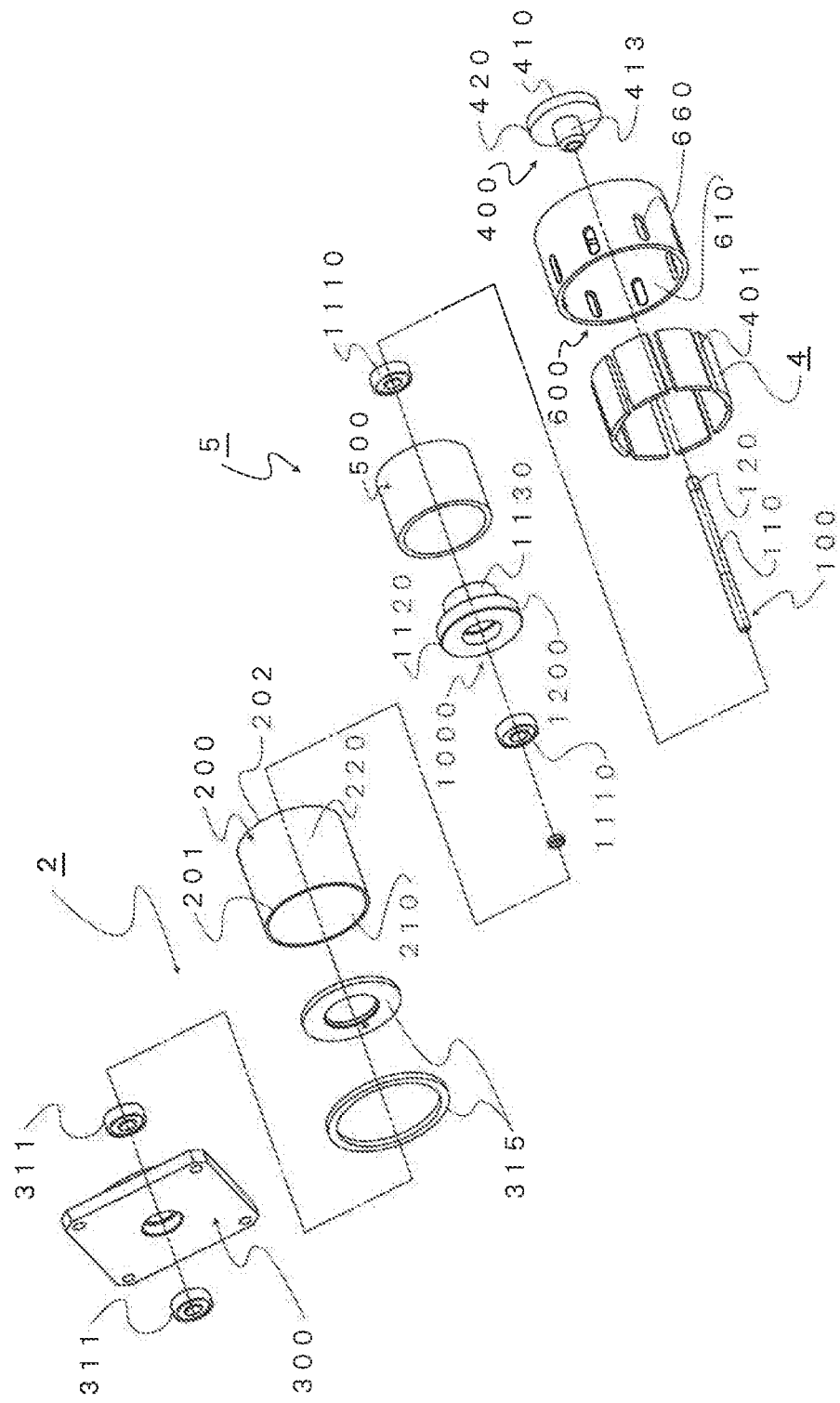
FIG. 13 is a schematic diagram showing a broken perspective view of components configuring a lid-type mount, an intermediate mount and a cup-type mount shown in FIG. 12.

Then, as shown in FIG. 8, a cooling method of the electric motor comprises each of steps of: feeding or intaking cooling medium or cooling air 80 from a channel 3200 provided in a stator 2 to a second air space 20; directly cooling an inner surface and an outer surface of a cylindrical coil 200 with the cooling medium or cooling air 80 under differential pressure around a rotor 3 generated by rotation of the rotor 3 and a second rotor 5; and discharging the cooling medium or cooling air 80 after flowing through a first air space 40 from the electric motor. Thereby, interior of the electric motor may be cooled similarly as the electric motor of the second aspect.

Further, as another improved electric motor of the present invention, an electric motor which is a fifth aspect and a sixth aspect of the present invention is considered based on FIG. 12 to FIG. 15. Structure of a lid-type mount 300 configuring a stator 2 is not different from that of the electric motor of the first aspect.

A difference between the improved electric motor and the electric motor of the first aspect is that a rotor 3 is configured with a rotor 3 in which a cup-type mount 400 including an outer yoke 600 with magnets 4 equipped on an inner surface is coupled to a driveshaft 100, and a second rotor 5 in which intermediate mount 1000 including an inner yoke 500, which forms a first air space i.e. an air gap 40 with the outer yoke 600 to work to close magnetic channel, is rotatably coupled with the driveshaft between a stator 2 and the rotor 3.

When the electric motor is started up by energizing a cylindrical coil 200, a rotor 3 firstly starts rotating. Next, as a second rotor 5 cooperates with a rotor 3 to form magnetic field, the second rotor 5 follows rotation of the rotor 3 and starts rotation with a little delay. When the electric motor reaches steady state, the rotor 3 and the second rotor 5 synchronously rotate. Thus, since the rotor 3 of the electric motor is separately configured from the inner yoke 500, it has a technical feature that inertia of the rotor 3 at startup and/or shutdown is smaller than that of the electric motor of the first aspect. However, as is clear from FIG. 12, it is structurally not necessary to provide a space 540 leading to a second air space 20 on an inner surface side of the inner yoke 500 fixed to the intermediate mount 1000 configuring the second rotor 5.

When the electric motor is compared with the electric motor of the third aspect of the present invention, since magnets 4 are equipped as bonded on the inner surface of the outer yoke 600 configuring the rotor 3, there is no risk that the magnets 4 would peel off under centrifugal force generated by high speed rotation of the rotor 3. And, as the magnets 4 are equipped with intervals 401 in longitudinal direction, cooling effect of the electric motor may be improved by further providing exhaust holes 660 on the outer yoke 600 at positions corresponding to the intervals 401, and fitting a multi-vane centrifugal blowing rotating body 2000 to the outer yoke 600 so as to correspond to a third air space 30 and the exhaust holes 660, such that flow of cooling medium or cooling air 80 in a first air space 40 is more efficient.

Figure 14:
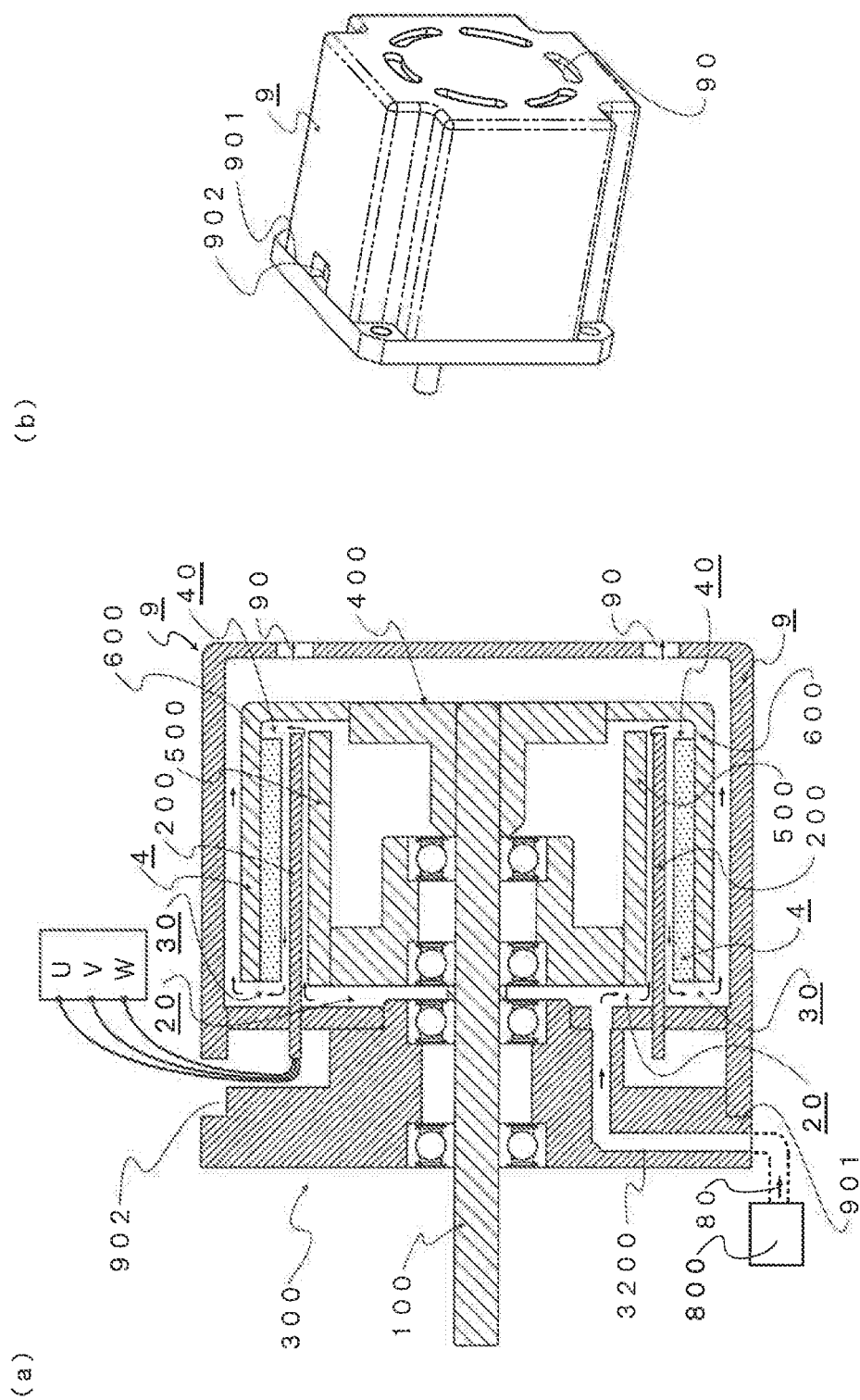
FIG. 14 is a schematic diagram showing a cross sectional view (a) and a perspective view (b) of the coreless rotating electrical machine shown in FIG. 12 to which an armor having a protection cover is mounted.
Figure 15:
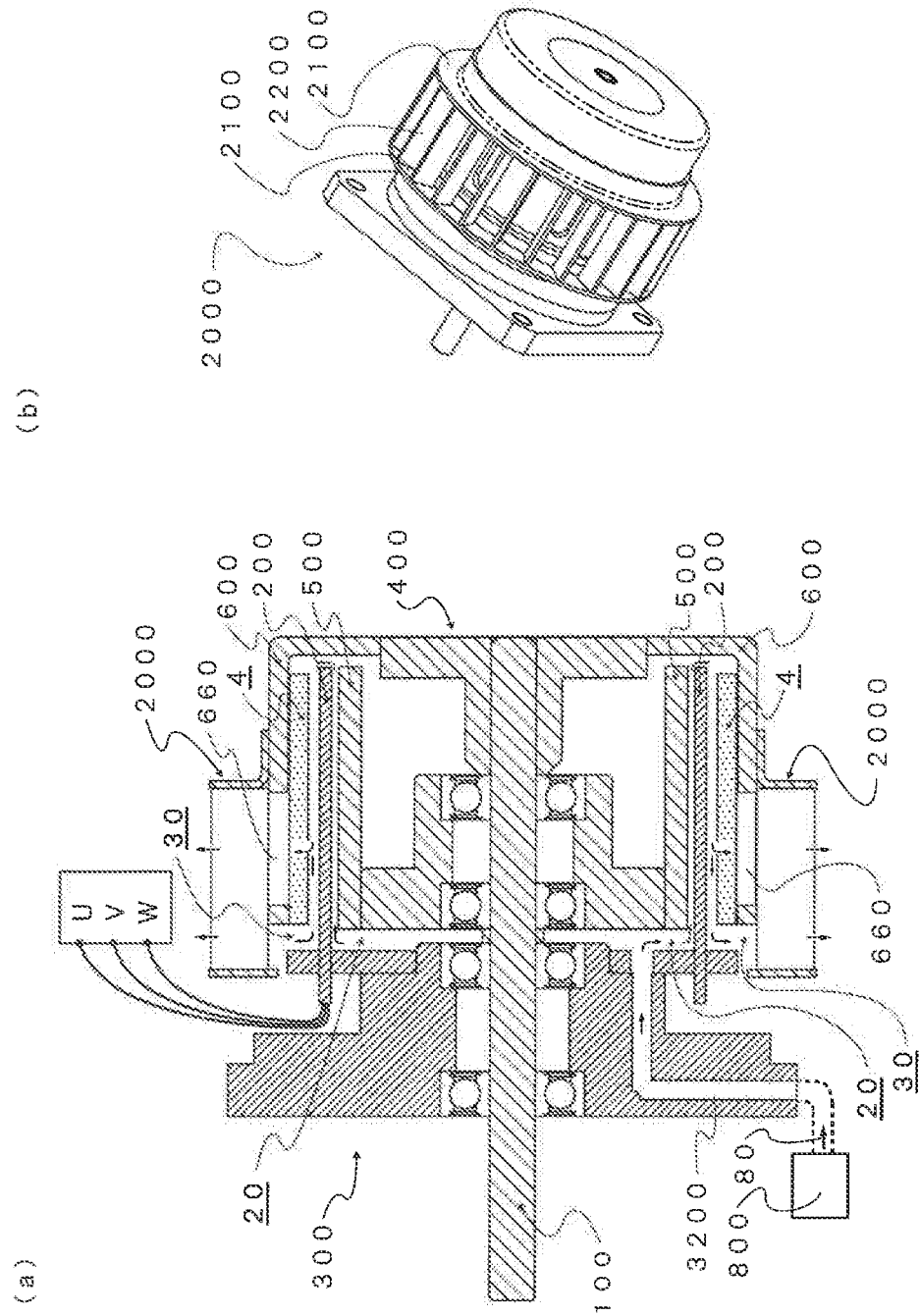
FIG. 15 is a schematic diagram showing a cross sectional view (a) and a perspective view (b) of the coreless rotating electrical machine shown in FIG. 12 to which a multi-vane centrifugal blowing rotating body is fit.

Then, as shown in FIG. 14 or FIG. 15, a cooling method of the electric motor comprises each of steps of: feeding or intaking cooling medium or cooling air 80 from a channel 3200 provided in a stator 2 to a second air space 20; directly cooling an inner surface and an outer surface of a cylindrical coil 200 with the cooling medium or cooling air 80 under differential pressure around a rotor 3 or a rotor 5 generated by rotation of the rotor 3 and a second rotor 5; and discharging the cooling medium or cooling air 80 after flowing through a first air space 40 from the electric motor. Thereby, interior of the electric motor may be cooled similarly as the electric motor of the second aspect or the fourth aspect.

One of the major factors which allowed for achieving the electric motor of the present invention is that an extremely thin cylindrical coil 200 having dynamic strength with a laminate structure of conductive metal sheets is successfully developed. One of end faces of the cylindrical coil 200 is closed as fixed to an inner surface of a stator, and the other open end face thereof is inserted as suspended to a narrow air gap 40, and thereby a body of the cylindrical coil 200 may be mounted in a magnetic field with high magnetic flux density.

Thereby, a second air space, a closed space which allows for feeding or intaking cooling medium or cooling air to interior of the electric motor, is formed, then from the second air space, the cooling medium or cooling air may follow contour of an inner surface and an outer surface of the cylindrical coil, and heated cooling medium or cooling air may be discharged to outside from a third air space which is an open space. Thus, the technical problem, i.e. the higher the driving voltage is set, the higher the cooling effect is, which seemed unachievable has been solved.

Although the present invention has been described for preferable embodiments, those skilled in the art may understand that various modifications may be made and elements may be replaced with equivalents without departing the scope of the present invention. Therefore, the present invention should not be limited to specific embodiments disclosed as the best mode of embodiments considered for implementing the present invention, and it is intended that the present invention encompasses all embodiments which belong to claims.

EXPLANATION OF NUMERICAL CHARACTERS

1: Coreless rotating electrical machine including armature
2: Stator
3: Rotor
4: Magnet
5: Second rotor
9: Armour
10: Coreless rotating electrical machine including armature
20: Second air space
30: Third air space
40: A first air space or an air gap
41: Inner clearance
42: Intermediate clearance
43: Outer clearance
80: Cooling medium or cooling air
90: Outlet
100: Driveshaft
110: Intermediate part of driveshaft
120: End part of driveshaft
200: Cylindrical coil
201: (Fixed) End face of cylindrical coil
202: (Open) End face of cylindrical coil
210: Inner surface of cylindrical coil
220: Outer surface of cylindrical coil
300: Lid-type mount
310: Center part of lid-type mount
311: Bearing mechanism of lid-type mount
312: Base of lid-type mount
313: Cylinder of lid-type mount
314: Pedestal of lid-type mount
315: Fixing plate of cylindrical coil
400: Cup-type mount
401: Interval between magnets
410: Center of cup-type mount
411: Support of cup-type mount
412: Cylindrical part of cup-type mount
430: Vent hole
431: Filter for vent hole
500: Inner cylindrical air-channel forming body or inner yoke
510: Inner surface side of inner cylindrical air-channel forming body or inner yoke
520: Outer surface side of inner cylindrical air-channel forming body or inner yoke
530: End face of inner cylindrical air-channel forming body or inner yoke
540: Inner surface side space of inner cylindrical air-channel forming body or inner yoke
560: Inner exhaust hole of inner cylindrical air-channel forming body or inner yoke
600: Outer cylindrical air-channel forming body or outer yoke
610: Outer cylindrical air-channel forming body or outer yoke
620: Outer cylindrical air-channel forming body or outer yoke
630: End face of outer cylindrical air-channel forming body or outer yoke
660: Outer exhaust hole of outer cylindrical air-channel forming body or outer yoke
800: Cooling device
900: Protection cover
901: End face of protection cover
910: Vent hole
1000: Intermediate mount
1001: Center of intermediate mount
1100: Hollow body of driveshaft
1110: Inlet
1120: Outlet
2000: Multi-vane centrifugal blowing rotating body
2100: Circular plate of multi-vane centrifugal blowing rotating body
2200: Vane of multi-vane centrifugal blowing rotating body
3001: Lead wire
3110: Bearing
3200: Channel in lid-type mount

The invention claimed is:

1. A coreless rotating electrical machine comprising:
    a stator having an energizeable coreless cylindrical coil and a lid-type mount which fixes one of end faces of the cylindrical coil, and in which a drive shaft is rotatably coupled to a first center part, and
    a rotor having a cup-type mount opposingly positioned with respect to the lid-type mount, having a bottom, an inner cylindrical air-channel forming body and an outer cylindrical air-channel forming body, and in which the drive shaft rotatably coupled to the lid-type mount is coupled and fixed to a second center part, and a plurality of magnets equipped on an inner surface of the outer cylindrical air-channel forming body or an outer surface of the inner cylindrical air-channel forming body with intervals with respect to each other in a circumference direction of the cylindrical coil, wherein the cup-type mount has a first air space which forms an air gap formed by the bottom, the inner cylindrical air-channel forming body and the outer cylindrical air-channel forming body, the cylindrical coil is arranged in the air gap as suspended such that another end face of the cylindrical coil leaves a clearance between the bottom, with a plurality of the equipped exposed magnets, a second air space positioned in an inner side of the cylindrical coil and a third air space positioned in an outer side of the cylindrical coil between one of end faces of the cup-type mount and the lid-type mount, wherein the cup-type mount has vent holes on the bottom for taking ambient air into the second air space, and the ambient air taken into the second air space under differential pressure generated around the rotor by rotation thereof and rotation of a plurality of the magnets flows through the first air space to directly cool a plurality of the heated magnets exposed in the first air space and both surfaces of the cylindrical coil arranged in the first air space and discharged to outside via the third air space.

2. The coreless rotating electrical machine as defined in claim 1, wherein the cylindrical coil is of a cylindrical shape having a laminate structure configured by a plurality of conductive metal sheets with a plurality of linear parts being spaced in a longitudinal direction, in such a manner that each linear part of the conductive metal sheets is covered by an insulating layer.

3. The coreless rotating electrical machine as defined in claim 1, wherein each of a plurality of the magnets is a cuboid being shaped such that a long side corresponds to a length of the cylindrical coil arranged in the first air space and a short side is equipped along a longitudinal direction of the cylindrical coil on the inner surface of the outer cylindrical air-channel forming body or the outer surface of the inner cylindrical air-channel forming body with intervals with respect to each other in a circumference direction of the cylindrical coil.

4. The coreless rotating electrical machine as defined in claim 1, wherein the cup-type mount further comprises a filter which covers the vent holes.

5. The coreless rotating electrical machine as defined in claim 1, wherein the cup-type mount is further provided with inner exhaust holes at positions in the inner cylindrical air-channel forming body or outer exhaust holes at positions in the outer cylindrical air-channel forming body which correspond to respective intervals of the magnets equipped with intervals in a circumference direction, along a longitudinal direction of the cylindrical coil.

6. The coreless rotating electrical machine as defined in claim 1, wherein the cup-type mount has a multi-vane centrifugal blowing rotating body, having two circular plates and a plurality of vanes oriented to a shaft center of the circular plates and suspended on the two circular plates fit thereto at a position corresponding to the third air space or the outer exhaust holes of the outer cylindrical air-channel forming body.

7. The coreless rotating electrical machine as defined in claim 1, wherein the stator further comprises an armor having a protection cover with a larger inner diameter than the outer cylindrical air-channel forming body which one of end faces thereof is supported by the lid-type mount, wherein, the armor has outlets for discharging the ambient air to be discharged from the third air space or the outer exhaust holes to outside.

8. A method for cooling a coreless rotating electrical machine, the coreless rotating electrical machine comprising:
a stator having an energizeable coreless cylindrical coil and a lid-type mount which fixes one of end faces of the cylindrical coil, and in which a drive shaft is rotatably coupled to a first center part, and
a rotor having a cup-type mount opposingly positioned with respect to the lid-type mount, having a bottom, an inner cylindrical air-channel forming body and an outer cylindrical air-channel forming body, and in which the drive shaft rotatably coupled to the lid-type mount is coupled and fixed to a second center part, and a plurality of magnets equipped on an inner surface of the outer cylindrical air-channel forming body or an outer surface of the inner cylindrical air-channel forming body with intervals with respect to each other in a circumference direction of the cylindrical coil,
wherein the cup-type mount has a first air space which forms an air gap formed by the bottom, the inner cylindrical air-channel forming body and the outer cylindrical air-channel forming body, the cylindrical coil is arranged in the air gap as suspended such that another end face of the cylindrical coil leaves a clearance between the bottom, with a plurality of the equipped exposed magnets, a second air space positioned in an inner side of the cylindrical coil and a third air space positioned in an outer side of the cylindrical coil, between one of end faces of the cup-type mount and the lid-type mount, and the cup-type mount has vent holes on the bottom for taking ambient air into the second air space,
wherein the method comprising steps of:
operating the rotor by energizing the cylindrical coil;
taking the ambient air into the second air space via the vent holes under differential pressure generated around the rotor by rotation thereof and rotation of a plurality of the magnets;
directly cooling a plurality of the heated magnets exposed in the first air space and the cylindrical coil arranged in the first air space by the ambient air taken into the second air space which flows through the first air space under differential pressure generated around the rotor by rotation thereof and rotation of a plurality of the magnets; and
discharging the ambient air which flowed through the first air space under differential pressure generated around the rotor by rotation thereof and rotation of a plurality of the magnets via the third air space from the coreless rotating electrical machine.

9. The method as defined in claim 8, wherein the cylindrical coil is of a cylindrical shape having a laminate structure configured by a plurality of conductive metal sheets with a plurality of linear parts being spaced in a longitudinal direction, in such a manner that each linear part of the conductive metal sheets is covered by an insulating layer.

10. The method as defined in claim 8, wherein each of a plurality of the magnets is a cuboid being shaped such that a long side corresponds to a length of the cylindrical coil arranged in the first air space and a short side is equipped along a longitudinal direction of the cylindrical coil on the inner surface of the outer cylindrical air-channel forming body or the outer surface of the inner cylindrical air-channel forming body with intervals with respect to each other in a circumference direction of the cylindrical coil.

11. The method as defined in claim 8, wherein the cup-type mount further comprises a filter which covers the vent holes.

12. The method as defined in claim 8, wherein the cup-type mount is further provided with inner exhaust holes at positions in the inner cylindrical air-channel forming body or outer exhaust holes at positions in the outer cylindrical air-channel forming body which correspond to respective intervals of the magnets equipped with intervals in a circumference direction, along a longitudinal direction of the cylindrical coil, wherein, the method further comprises a step of discharging the ambient air, which flowed through the first air space via the third air space and the inner exhaust holes or the outer exhaust holes, from the coreless rotating electrical machine.

13. The method as defined in claim 8, wherein the cup-type mount has a multi-vane centrifugal blowing rotating body, having two circular plates and a plurality of vanes oriented to a shaft center of the circular plates and suspended on the two circular plates fit thereto at a position corresponding to the third air space or the outer exhaust holes of the outer cylindrical air-channel forming body, so as to further raise differential pressure generated around the rotor by rotation thereof and rotation of a plurality of the magnets with the multi-vane centrifugal blowing rotating body such that flow of the ambient air taken into the second air space may be raised, and that the ambient air is discharged from the coreless rotating electrical machine via the third air space after flowing through the first air space.

14. The method as defined in claim 8, wherein the stator further comprises an armor having a protection cover with a larger inner diameter than the outer cylindrical air-channel forming body which one of end faces thereof is supported by the lid-type mount and the armor is provided with outlets in a part thereof, wherein, the method further comprises a step of discharging the ambient air discharged from the third air space or the outer exhaust holes from the outlets.

\* \* \* \* \*